(12) United States Patent
Perrett

(10) Patent No.: US 8,812,279 B2
(45) Date of Patent: Aug. 19, 2014

(54) APPARATUS AND METHOD FOR DETERMINING OPTIMUM PATHS IN A MULTI-LAYER NETWORK USING A ROUTING ENGINE

(75) Inventor: Jay Perrett, Calne (GB)

(73) Assignee: Aria Networks Limited, Chippenham (GB)

( * ) Notice: Subject to any disclaimer, the term of this patent is extended or adjusted under 35 U.S.C. 154(b) by 263 days.

(21) Appl. No.: 13/498,405

(22) PCT Filed: Sep. 28, 2010

(86) PCT No.: PCT/GB2010/051621
§ 371 (c)(1),
(2), (4) Date: Mar. 27, 2012

(87) PCT Pub. No.: WO2011/036500
PCT Pub. Date: Mar. 31, 2011

(65) Prior Publication Data
US 2012/0185229 A1    Jul. 19, 2012

Related U.S. Application Data

(60) Provisional application No. 61/246,424, filed on Sep. 28, 2009.

(51) Int. Cl.
*H04L 12/24* (2006.01)
*H04L 12/56* (2006.01)
*G06N 3/12* (2006.01)
*G06F 13/00* (2006.01)

(52) U.S. Cl.
CPC .............. *G06N 3/126* (2013.01); *H04L 41/145* (2013.01); *H04L 45/64* (2013.01)
USPC ...................... 703/2; 703/18; 703/19; 706/26

(58) Field of Classification Search
USPC .............. 703/2, 18, 19; 706/26; 709/227, 238
See application file for complete search history.

(56) References Cited

U.S. PATENT DOCUMENTS 6,601,053 B1 *   7/2003   Schaffer et al. .................. 706/26
7,145,898 B1 *  12/2006   Elliott ........................... 370/352

(Continued)

OTHER PUBLICATIONS

M. Yannuzzi et al., "Maximum coverage at minimum cost for multi-domain IP/MPLS networks," Proceedings of the 27th Conference on Computer Communications (INFOCOM I 08), Apr. 13, 2008, pp. 1831-1839.

(Continued)

*Primary Examiner* — Thai Phan
(74) *Attorney, Agent, or Firm* — Edouard Garcia

(57) ABSTRACT

Network simulation equipment for determining routes across a multi-layer system, the network simulation equipment comprising: an adaptor module configured to convert a multi-layer system into a multi-layer network of nodes and links; a first routing engine configured to determine a plurality of populations of paths, each population of paths corresponding to a route across a layer of the multi-layer network; a second routing engine configured to determine a plurality of multi-layer populations of paths, each multi-layer population of paths corresponding to a route across the multi-layer network and comprising populations of paths for at least two different layers of the multi-layer network selected from the plurality of populations of paths determined by the first routing engine; and an evolving module configured to mate at least two multi-layer populations of paths from the plurality of multi-layer populations of paths to create a third multi-layer population of paths.

20 Claims, 14 Drawing Sheets

(56) References Cited

U.S. PATENT DOCUMENTS 8,423,648 B2*  4/2013  Ferguson et al. ............. 709/227
2003/0212645 A1* 11/2003  Schaffer et al. ................. 706/25
2005/0198377 A1*  9/2005  Ferguson et al. ............. 709/238

OTHER PUBLICATIONS

J. Rak: "Algorithms of fast service restoration in survivable multi layer networks," Nov. 2008.
K.-H. Ho. G. Pavlou. N. Wang. M. Howarth: "Joint optimization of intra-and inter-autonomous system traffic engineering" IEEE Transactions on Network and Service Management. vol. 6. No. 2. Jun. 2009. pp. 64-79.
S. Balon: "Contributions to traffic engineering and resilience in computer networks" Nov. 7, 2008.
K. Lenarski, B. Czajka. I. Pozniak-Koszalka. A. Kasprzak: "Tabu search algorithm for two-layer networks design problem" Proceedings of the 19th International Conference on Systems Engineering (ICSENG'08). Aug. 19, 2008.
W. Bigos. B. Cousin. S. Gosselin. M. Le Foll. H. Nakajima: "Survivable MPLS over optical transport networks: cost and resource usage analysis" iFEE Journal on Selected Areas in Communications. vol. 25. No. 5. May 29, 2007, pp. 949-982.
N. Sengezer. B. Puype. E. Karasan. M. Pickavet: "A comparative study of single-layer and multi-layer traffic engineering approaches on transparentoptical networks" Proceedings of the 9th International Conference on Transparent Optical Networks (ICTON'07). Jul. 1, 2007. pp. 105-108.
R. Rughims. R. Deaconescu: "Optimization strategies for MPLS traffic engineering" U.P.B. Scientific Bulletin. Series C. vol. 71. No. 1, Mar. 31, 2009, pp. 91-102.
D. King. T. Tsuritani: "Deploying advanced path computation technologies for optical transport networks": Jun. 5-6, 2008. [Online] Jun. 6, 2003. pp. 1-14—meeting agenda. XP002624723 4th International Conference on IP+Optical Network (IPOP'08).
D. King: "Network planning and path computation for next generation networks" 6th UK Network Operators' Forum Meeting (UKNOF'6). [Online] Jan. 19, 2007, pp. 1-14—Online proceedings. XP002624724.

\* cited by examiner

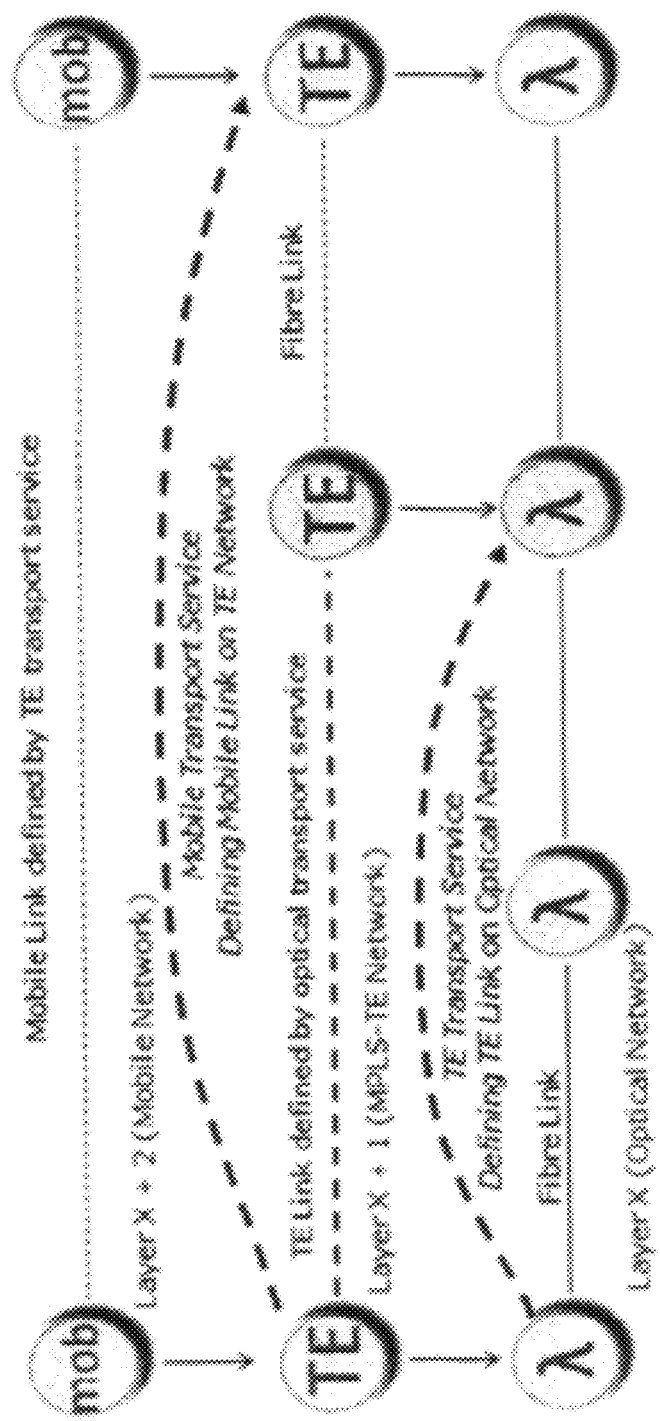

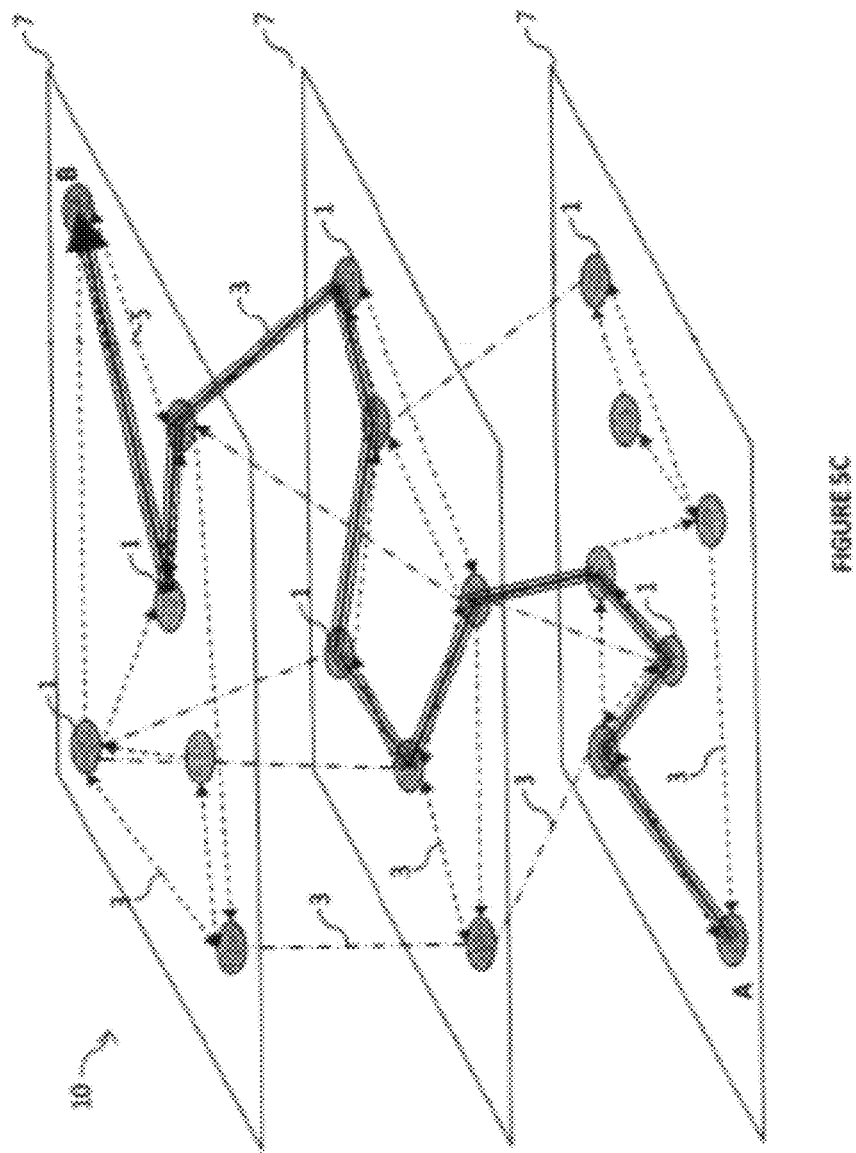

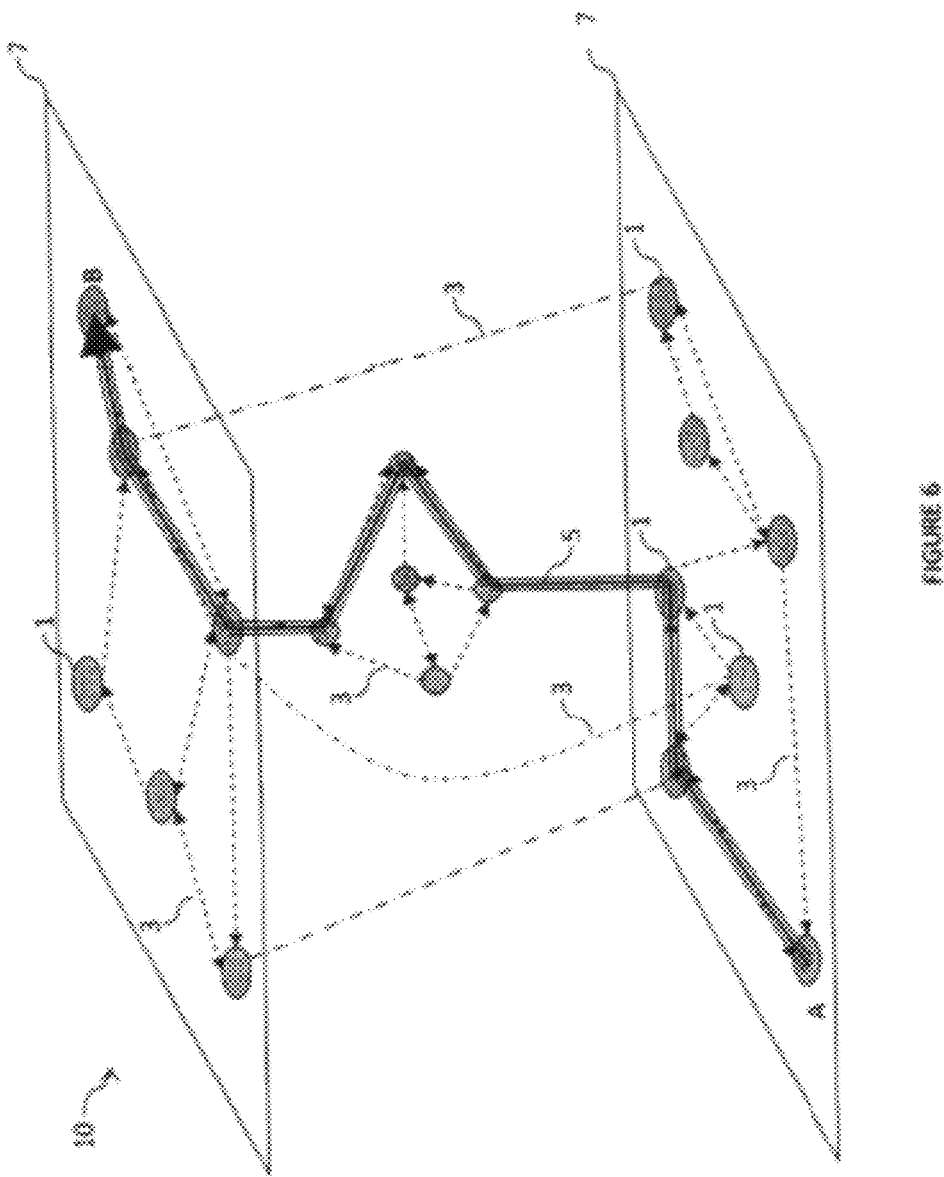

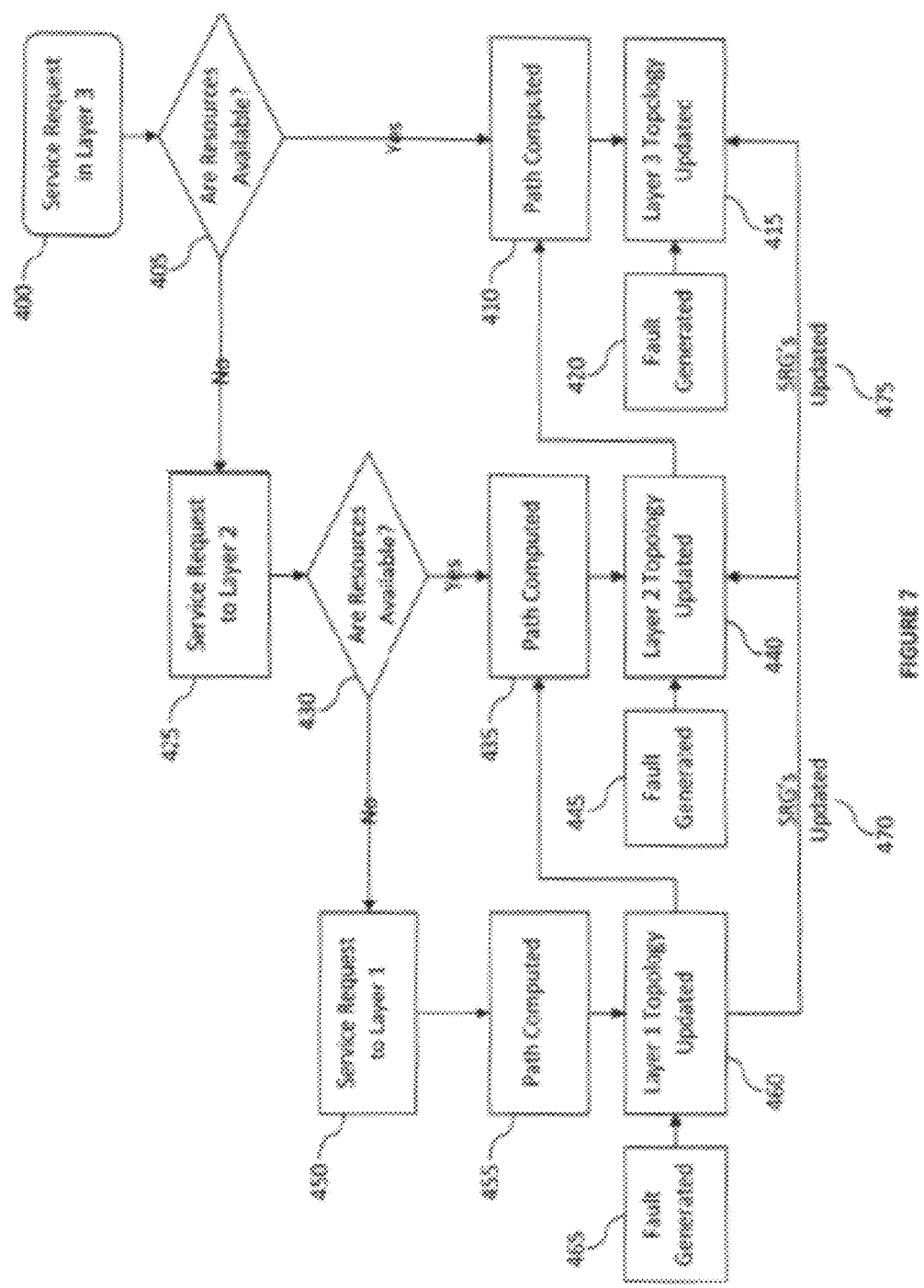

APPARATUS AND METHOD FOR DETERMINING OPTIMUM PATHS IN A MULTI-LAYER NETWORK USING A ROUTING ENGINE

CROSS-REFERENCE TO RELATED APPLICATIONS

This application is the National Stage of International Application No. PCT/GB2010/051621, filed Sep. 28, 2010, which claims the benefit of U.S. Provisional Application No. 61/246,424, filed Sep. 28, 2009.

TECHNICAL FIELD

The invention relates to apparatus and methods for determining one or more optimum routes across a multi-layer network using a routing engine. In particular, the invention relates to apparatus and methods for determining and altering routes across a multi-layer network when resources are used and/or when network topologies change due to failure or removal of components, the provision of new links and/or components, or the provision of a new traffic matrix.

BACKGROUND

Known apparatus for determining one or more optimal routes from a single source to a single destination (point-to-point) involve determining each route separately and in a pre-determined order. This leads to network resource utilisation inefficiencies. In addition, known apparatus tend to focus on a single or only several requirements, optimising the route for each requirement at a time.

In addition, known apparatus used to determine routes are specific to the network type/technology under consideration and the outcome of what is considered optimal is static.

For example, in the field of telecommunications which typically comprises many network layers, operators tend to optimise individual routes for telecommunications services in a specific order and optimise network resource utilisation at each network layer independently using techniques that are specific to the network technology layer in question. This is because it is highly complex to optimize network resource utilization globally, i.e. taking into account all layers. Such routes are determined by methods which have fixed outcomes, leading to inefficiencies, a lack of understanding of inter-layer dependencies and low levels of competitive differentiation. However, failure to consider multi layer aspects compromises network efficiency and misses the opportunity to understand the impact of failure in lower transport layers.

Embodiments of the present invention aim to provide improved apparatus, methods and computer code relating to routing engines. For example, certain embodiments of the present invention aim to provide distributed, multiprocessor, scalable and fault tolerant capabilities for determining one or more optimal routes and ensuring a flexible policy driven approach to the determination of optimal routes for, but not limited to, the next-generation of Next Generation telecommunications networks and services using a GRE (Generic Routing Engine). In addition, embodiments described below aim to provide a method for multi-layer computation with a collection of connected GREs.

Furthermore, embodiments described below aim to provide network modelling which can alter as network resources are used or as the network topology changes, owing to failure and/or removal of components, and/or the provision of new of components.

Exemplary methods and apparatus described below could be used for or by routing systems, network management systems, network elements/devices, path-computation elements/systems, modelling and planning systems and other operational support systems.

SUMMARY

According to one embodiment of the invention, network simulation equipment for determining routes across a multi-layer system is provided. The network simulation equipment comprising: an adaptor module configured to convert a multi-layer system into a multi-layer network of nodes and links; a first routing engine configured to determine a plurality of populations of paths, each population of paths corresponding to a route across a layer of the multi-layer network; a second routing engine configured to determine a plurality of multi-layer populations of paths, each multi-layer population of paths corresponding to a route across the multi-layer network and comprising populations of paths for at least two different layers of the multi-layer network selected from the plurality of populations of paths determined by the first routing engine; and an evolving module configured to mate at least two multi-layer populations of paths from the plurality of multi-layer populations of paths to create a third multi-layer population of paths.

According to another embodiment of the invention, the evolving module is further configured to mutate the mated at least two multi-layer populations of paths to create the third multi-layer population of paths.

According to another embodiment of the invention, the network simulation equipment further comprises: a Genepool storage module configured to store the plurality of multi-layer populations of paths determined by the second routing engine, and to store the third multi-layer population of paths.

According to another embodiment of the invention, wherein the first routing engine further comprises: a directory storage module configured to store the plurality of populations of paths.

According to another embodiment of the invention, the network simulation equipment further comprises: a node linkage module configured to store node constraint data for each node of the multi-layer network.

According to another embodiment of the invention, the node constraint data comprises data regarding properties and/or services associated with each node.

According to another embodiment of the invention, the network simulation equipment further comprises: a link linkage module configured to store link constraint data for each link of the multi-layer network.

According to another embodiment of the invention, the link constraint data comprises data regarding properties and/or services associated with each link.

According to another embodiment of the invention, the first routing engine is selected from a plurality of first routing engines based on the constraints of the layer.

According to another embodiment of the invention, the route across a layer of the multi-layer network use properties and/or services from at least one other layer of the multi-layer network.

According to another embodiment of the invention, the first routing engine is further configured to assign resources to each of the plurality of populations of paths, and the first routing engine further comprises: a first objective function module configured to determine at least one objective function for each of the plurality of populations of paths.

According to another embodiment of the invention, the first objective function is calculated based on one or more requirements.

According to another embodiment of the invention, the requirements comprise one or more of: disjointedness; cost; utilisation; delay; speed; efficiency.

According to another embodiment of the invention, the second routing engine selects the populations of paths for the at least two different layers of the multi-layer network from the plurality of populations of paths based on the populations of paths first objective functions.

According to another embodiment of the invention, the first routing engine further comprises: a layer mutation operators module configured to store mutation operations for application to the plurality of populations of paths.

According to another embodiment of the invention, the first routing engine is configured to create a matrix of candidate paths from a first node to a second node for each layer of the multi-layer network, and to select candidate paths from the matrix in order to determine the plurality of populations of paths for each layer of the multi-layer network.

According to another embodiment of the invention, the network simulation equipment further comprises: a plurality of first routing engines, and wherein the plurality of populations of paths are generated in parallel by the plurality of first routing engines.

According to another embodiment of the invention, the plurality of populations of paths are generated simultaneously.

According to another embodiment of the invention, the evolving module is further configured to select a first multi-layer population of paths from a plurality of multi-layer populations of paths and select a second multi-layer population of paths, different from the first multi-layer population of paths, from the plurality of multi-layer populations of paths, prior to mating the first and second multi-layer population of paths.

According to another embodiment of the invention, the evolving module is further configured to swap at least one layer of the first multi-layer population of paths with at least one layer of the second multi-layer population of paths to create the third multi-layer population of paths.

According to another embodiment of the invention, the evolving module is further configured to overlay the first multi-layer population of paths with the second multi-layer population of paths, to determine similarities and differences between the first and second multi-layer populations of paths, and to select at least one of the similarities and differences to create the third multi-layer population of paths.

According to another embodiment of the invention, the second routing engine is further configured to assign resources to each of the plurality of multi-layer populations of paths, and the second routing engine further comprises: a second objective function module configured to determine at least one second objective function for each of the plurality of multi-layer populations of paths.

According to another embodiment of the invention, the second objective function is calculated based on one or more requirements.

According to another embodiment of the invention, the requirements comprises one or more of: disjointedness cost; utilisation; delay; speed; efficiency.

According to another embodiment of the invention, the second objective function module is configured to determine if the second objective function meets an acceptance criteria, discard the third multi-layer population of paths if the second objective function is below the acceptance criteria, or store the third multi-layer population of paths if the second objective function is equal to or above the acceptance criteria.

According to another embodiment of the invention, the evolving module is further configured to select the at least two multi-layer populations of paths for mating based on their second objective functions.

According to another embodiment of the invention, the evolving module is further configured to select the at least two multi-layer populations of paths simultaneously.

According to another embodiment of the invention, the network simulation equipment further comprises: a plurality of second routing engines, and wherein the plurality of multi-layer populations of paths are generated in parallel by the plurality of second routing engines.

According to another embodiment of the invention, the plurality of multi-layer populations of paths are generated simultaneously.

According to another embodiment of the invention, the network simulation equipment further comprises: a multi-layer mutation operators module configured to store mutations to be applied to the third multi-layer population of paths.

According to another embodiment of the invention, the evolving module is further configured to determine whether to mutate at least one of the population of paths of the at least two multi-layer populations of paths, and instructs the first routing engine associated with the layer of the at least one population of paths to mutate the at least one population of paths in accordance with the stored mutations.

According to another embodiment of the invention, the mutations comprise one or more of: instructing the first routing engine not to perform a function on the at least one population of paths; instructing the first routing engine to perform a computation on the at least one population of paths; instructing the first routing engine to modify the at least one population of paths; instructing the first routing engine to select a different population of paths to replace the at least one of the population of paths.

According to another embodiment of the invention, modifying at least one of the population of paths comprises modifying one or more of: topology of the layer of the at least one population of paths; the properties and/or services of the nodes and/or links of the layer of the at least one population of paths; interconnections of the nodes of the layer of the at least one population of paths.

According to another embodiment of the invention, the network simulation equipment further comprises: a multi-layer scenarios module configured to store connections between the layers of the multi-layer network.

According to another embodiment of the invention, the multi-layer scenarios module is further configured to store data defining whether a layer can be skipped.

According to another embodiment of the invention, each node comprises a terminal point or an intersection point of the multi-layer network.

According to another embodiment of the invention, each link comprises a connection between two or more nodes.

According to another embodiment of the invention, each link comprises a uni-directional link or a bi-directional link.

According to another embodiment of the invention, the multi-layer system comprises a multi-layer system of IP routers; a multi-layer system of roads; a multi-layer telephone communication system; a multi-layer utility distribution system; a multi-layer system of blood vessels; a multi-layer system for dataflow; a multi-layer system for social interaction.

According to one embodiment of the invention, a method of operating network simulation equipment for determining routes across a multi-layer system is provided. The method comprising: converting a multi-layer system into a multi-layer network of nodes and links; determining a plurality of populations of paths, each population of paths corresponding to a route across a layer of the multi-layer network; determining a plurality of multi-layer populations of paths, each multi-layer population of paths corresponding to a route across the multi-layer network and comprising populations of paths for at least two different layers of the multi-layer network selected from the plurality of populations of paths; mating at least two multi-layer populations of paths from the plurality of multi-layer populations of paths to create a third multi-layer population of paths.

According to another embodiment of the invention, the method further comprises: mutating the mated at least two multi-layer populations of paths to create the third multi-layer population of paths.

According to another embodiment of the invention, the method further comprises: storing the plurality of multi-layer populations of paths and the third multi-layer population of paths in a Genepool storage module.

According to another embodiment of the invention, the method further comprises: storing the plurality of populations of paths in a directory storage module.

According to another embodiment of the invention, the method further comprises: storing node constraint data for each node of the multi-layer network in a node linkage module.

According to another embodiment of the invention, the method further comprises: storing link constraint data for each link of the multi-layer network in a link linkage module.

According to another embodiment of the invention, the method further comprises: selecting the first routing engine from a plurality of first routing engines based on the constraints of the layer.

According to another embodiment of the invention, the method further comprises: assigning resources to each of the plurality of populations of paths; and determining at least one objective function for each of the plurality of populations of paths.

According to another embodiment of the invention, the method further comprises: determining the at least one objective function for each of the plurality of populations of paths based on one or more requirements.

According to another embodiment of the invention, the method further comprises: selecting the populations of paths for at least two different layers of the multi-layer network based on first objective functions of the populations of paths.

According to another embodiment of the invention, determining the plurality of populations of paths further comprising: creating a matrix of candidate paths from a first node to a second node for each layer of the multi-layer network; and selecting candidate paths from the matrix in order to determine the plurality of populations of paths.

According to another embodiment of the invention, the method further comprises: determining the plurality of populations of paths in parallel.

According to another embodiment of the invention, the method further comprises: determining the plurality of populations of paths simultaneously.

According to another embodiment of the invention, the method further comprises: selecting a first multi-layer population of paths from a plurality of multi-layer populations of paths and selecting a second multi-layer population of paths, different from the first multi-layer population of paths, from the plurality of multi-layer populations of paths, prior to mating the first and second multi-layer population of paths.

According to another embodiment of the invention, the method further comprises: swapping at least one layer of the first multi-layer population of paths with at least one layer of the second multi-layer population of paths to create the third multi-layer population of paths.

According to another embodiment of the invention, the method further comprises: overlaying the first multi-layer population of paths with the second multi-layer population of paths; determining similarities and differences between the first and second multi-layer populations of paths; and selecting at least one of the similarities and differences to create the third multi-layer population of paths.

According to another embodiment of the invention, the method further comprises: assigning resources to each of the plurality of multi-layer populations of paths; and determining at least one second objective function for each of the plurality of multi-layer populations of paths.

According to another embodiment of the invention, the method further comprises: determining at least one second objective function based on one or more requirements.

According to another embodiment of the invention, the method further comprises: determining if the second objective function meets an acceptance criteria; discarding the third multi-layer population of paths if the second objective function is below the acceptance criteria; or storing the third multi-layer population of paths if the second objective function is equal to or above the acceptance criteria.

According to another embodiment of the invention, the method further comprises: selecting the at least two multi-layer populations of paths for mating based on their second objective functions.

According to another embodiment of the invention, the method further comprises: selecting the at least two multi-layer populations of paths simultaneously.

According to another embodiment of the invention, the method further comprises: generating the plurality of multi-layer populations of paths in parallel.

According to another embodiment of the invention, the method further comprises: generating the plurality of multi-layer populations of paths simultaneously.

According to another embodiment of the invention, the method further comprises: storing mutations to be applied to the third multi-layer population of paths.

According to another embodiment of the invention, the method further comprises: determining whether to mutate at least one of the population of paths of the at least two multi-layer populations of paths; and instructing a first routing engine associated with the layer of the at least one of the population of paths to mutate the at least one of the population of paths in accordance with the stored mutations.

According to another embodiment of the invention, the method further comprises: storing connections between the layers of the multi-layer network.

According to another embodiment of the invention, the method further comprises: storing data defining whether a layer can be skipped.

According to one embodiment of the invention, network simulation equipment for evolving routes across a multi-layer network of nodes and links is provided. The network simulation equipment comprising: an evolving module configured to select a first multi-layer population of paths from a plurality of multi-layer populations of paths, each multi-layer population of paths corresponds to a route across the multi-layer network and comprises populations of paths for at least two different layers of the multi-layer network, and a second multi-layer population of paths from the plurality of multi-layer populations of paths, and to mate the first and second multi-layer population of paths to create a third multi-layer population of paths; a resources module configured to assign resources to the third multi-layer population of paths; and an objective function module configured to determine at least one objective function of the third multi-layer population of paths.

According to another embodiment of the invention, the evolving module is further configured to mutate the mated first and second multi-layer populations of paths to create the third multi-layer population of paths.

According to another embodiment of the invention, the network simulation equipment further comprises: a Genepool storage module configured to store the plurality of multi-layer populations of paths, and to store the third multi-layer population of paths.

According to another embodiment of the invention, the evolving module is further configured to swap at least one layer of the first multi-layer population of paths with at least one layer of the second multi-layer population of paths to mate the first and second multi-layer population of paths.

According to another embodiment of the invention, the evolving module is further configured to overlay the first multi-layer population of paths with the second multi-layer population of paths, to determine similarities and differences between the first and second multi-layer populations of paths, and to select at least one of the similarities and differences to mate the first and second multi-layer population of paths and create the third multi-layer population of paths.

According to another embodiment of the invention, the at least one objective function is calculated based on one or more requirements.

According to another embodiment of the invention, the requirements comprises one or more of: disjointedness cost; utilisation; delay; speed; efficiency.

According to another embodiment of the invention, the objective function module is configured to determine if the objective function meets an acceptance criteria, discard the third multi-layer population of paths if the objective function is below the acceptance criteria, or store the third multi-layer population of paths if the objective function is equal to or above the acceptance criteria.

According to another embodiment of the invention, the evolving module is further configured to select the at least two multi-layer populations of paths for mating based on their objective functions.

According to another embodiment of the invention, the network simulation equipment further comprises: a multi-layer mutation operators module configured to store mutations to be applied to the third multi-layer population of paths.

According to another embodiment of the invention, the evolving module is further configured to determine whether to mutate at least one population of paths of the first and second multi-layer populations of paths, and instructs a routing engine associated with the layer of the at least one population of paths to mutate the at least one population of paths in accordance with the stored mutations.

According to another embodiment of the invention, the mutations comprise one or more of: instructing the routing engine not to perform a function on the at least one population of paths; instructing the routing engine to perform a computation on the at least one population of paths; instructing the routing engine to modify the at least one population of paths; instructing the routing engine to select a different population of paths to replace the at least one population of paths.

According to another embodiment of the invention, modifying the at least one of the population of paths comprises modifying one or more of: topology of a layer of the at least one population of paths; properties and/or services of the nodes and/or links of a layer of the at least one population of paths; interconnections of the nodes of a layer of the at least one population of paths.

According to another embodiment of the invention, the evolving module is further configured to select the first and second multi-layer populations of paths simultaneously.

According to another embodiment of the invention, each node comprises a terminal point or an intersection point of the multi-layer network.

According to another embodiment of the invention, each link comprises a connection between two or more nodes.

According to another embodiment of the invention, each link comprises a uni-directional link or a bi-directional link.

According to one embodiment of the invention, a method of operating network simulation equipment for evolving routes across a multi-layer network of nodes and links is provided. The method comprising: selecting a first multi-layer population of paths from a plurality of multi-layer populations of paths, each multi-layer population of paths corresponding to a route across the multi-layer network and comprising populations of paths for at least two different layers of the multi-layer network; selecting a second multi-layer population of paths from the plurality of multi-layer populations of paths; mating the first and second multi-layer population of paths to create a third multi-layer population of paths; assigning resources to the third multi-layer population of paths; and determining at least one objective function of the third multi-layer population of paths.

According to another embodiment of the invention, the method further comprises: mutating the mated first and second multi-layer populations of paths to create the third multi-layer population of paths.

According to another embodiment of the invention, the method further comprises: storing the plurality of multi-layer populations of paths, and the third multi-layer population of paths.

According to another embodiment of the invention, the method further comprises: swapping at least one layer of the first multi-layer population of paths with at least one layer of the second multi-layer population of paths to mate the first and second multi-layer population of paths.

According to another embodiment of the invention, the method further comprises: overlaying the first multi-layer population of paths with the second multi-layer population of paths, to determine similarities and differences between the first and second multi-layer populations of paths, and to select at least one of the similarities and differences to mate the first and second multi-layer population of paths and create the third multi-layer population of paths.

According to another embodiment of the invention, the method further comprises: determining at least one objective function based on one or more requirements.

According to another embodiment of the invention, the requirements comprises one or more of: disjointedness cost; utilisation; delay; speed; efficiency.

According to another embodiment of the invention, the method further comprises: determining if the objective function meets an acceptance criteria; discarding the third multi-layer population of paths if the objective function is below the acceptance criteria; or storing the third multi-layer population of paths if the objective function is equal to or above the acceptance criteria.

According to another embodiment of the invention, the method further comprises: selecting the at least two multi-layer populations of paths for mating based on their objective functions.

According to another embodiment of the invention, the method further comprises: storing mutations to be applied to the third multi-layer population of paths.

According to another embodiment of the invention, the method further comprises: determining whether to mutate at least one population of paths of the first and second multi-layer populations of paths; and instructing a routing engine associated with the layer of the at least one the population of paths to mutate the at least one of the population of paths in accordance with the stored mutations.

According to another embodiment of the invention, the mutations comprise one or more of: instructing the routing engine not to perform a function on at least one of the population of paths of the first and second multi-layer populations of paths; instructing the routing engine to perform a computation on at least one of the population of paths of the first and second multi-layer populations of paths; instructing the routing engine to modify at least one of the population of paths of the first and second multi-layer populations of paths; instructing the routing engine to select a different population of paths to replaces at least one of the population of paths of the first and second multi-layer populations of paths.

According to another embodiment of the invention, the method further comprises: selecting the first and second multi-layer populations of paths simultaneously.

According to one embodiment of the invention, network simulation equipment for creating a Genepool of routes across a multi-layer network of nodes and links is provided. The network simulation equipment comprising: a routing engine configured to determine a plurality of multi-layer populations of paths, each multi-layer population of paths corresponding to a route across the multi-layer network and comprising a population of paths corresponding to a route across a layer of the multi-layer network for at least two different layers of the multi-layer network; a mutations operators module configured to mutate each of the plurality of multi-layer population of paths; a resources module configured to assign resources to each of the plurality of multi-layer population of paths; an objective function module configured to determine at least one objective function of the plurality of each multi-layer population of paths; and a Genepool storage module configured to store the plurality of multi-layer population of paths associated with their determined objective function.

According to another embodiment of the invention, the network simulation equipment further comprises: an adaptor module configured to convert a multi-layer system into the multi-layer network of nodes and links.

According to another embodiment of the invention, the mutations operators module further comprises: a mutation operators storage device configured to store mutations to be applied to each of the plurality of multi-layer population of paths.

According to another embodiment of the invention, the mutations operators module is further configured to determine whether to mutate at least one of the population of paths of the multi-layer population of paths, and instructs a second routing engine associated with the layer of the at least one population of paths to mutate the at least one population of paths in accordance with the stored mutations.

According to another embodiment of the invention, the mutations comprise one or more of: instructing the second routing engine not to perform a function on the at least one population of paths; instructing the second routing engine to perform a computation on the at least one population of paths; instructing the second routing engine to modify the at least one population of paths; instructing the second routing engine to select a different population of paths to replace the at least one population of paths.

According to another embodiment of the invention, modifying the at least one population of paths comprises modifying one or more of: topology of the layer of the at least one population of paths; properties and/or services of the nodes and/or links of the layer of the at least one population of paths; interconnections of the nodes of the layer of the at least one population of paths.

According to another embodiment of the invention, the network simulation equipment further comprises: a node linkage module configured to store node constraint data for each node of the multi-layer network.

According to another embodiment of the invention, the node constraint data comprises data regarding properties and/or services associated with each node.

According to another embodiment of the invention, the network simulation equipment further comprises: a link linkage module configured to store link constraint data for each link of the multi-layer network.

According to another embodiment of the invention, the link constraint data comprises data regarding properties and/or services associated with each link.

According to another embodiment of the invention, the route across a layer of the multi-layer network use properties and/or services from at least one other layer of the multi-layer network.

According to another embodiment of the invention, the objective function is calculated based on one or more requirements.

According to another embodiment of the invention, the requirements comprises one or more of: disjointedness cost; utilisation; delay; speed; efficiency.

According to another embodiment of the invention, the network simulation equipment further comprises: a plurality of routing engines, and wherein the plurality of multi-layer populations of paths are generated in parallel by the plurality of routing engines.

According to another embodiment of the invention, the plurality of multi-layer populations of paths are generated simultaneously.

According to another embodiment of the invention, the network simulation equipment further comprises: a multi-layer scenarios module configured to store connections between the layers of the multi-layer network.

According to another embodiment of the invention, the multi-layer scenarios module is further configured to store data defining whether a layer can be skipped.

According to another embodiment of the invention, each node comprises a terminal point or an intersection point of the multi-layer network.

According to another embodiment of the invention, each link comprises a connection between two or more nodes.

According to another embodiment of the invention, each link comprises a uni-directional link or a bi-directional link.

According to another embodiment of the invention, the multi-layer system comprises a multi-layer system of IP routers; a multi-layer system of roads; a multi-layer telephone communication system; a multi-layer utility distribution system; a multi-layer system of blood vessels; a multi-layer system for dataflow; a multi-layer system for social interaction.

According to one embodiment of the invention, a method of operating network simulation equipment for creating a Genepool of routes across a multi-layer network of nodes and links is provided. The method comprising: determining a plurality of multi-layer populations of paths, each multi-layer population of paths corresponding to a route across the multi-layer network and comprising a population of paths corresponding to a route across a layer of the multi-layer network for at least two different layers of the multi-layer network; mutating each of the plurality of multi-layer population of paths; assigning resources to each of the plurality of multi-layer population of paths; determining an objective function for each of the plurality of multi-layer population of paths; and storing the plurality of multi-layer population of paths in a Genepool associated with their determined objective function.

According to another embodiment of the invention, the method further comprises: converting a multi-layer system into the multi-layer network of nodes and links.

According to another embodiment of the invention, the method further comprises: storing mutations to be applied to each of the plurality of multi-layer population of paths.

According to another embodiment of the invention, the method further comprises: determining whether to mutate at least one of the population of paths of the multi-layer population of paths; and instructing a routing engine associated with the layer of the at least one population of paths to mutate the at least one population of paths in accordance with the stored mutations.

According to another embodiment of the invention, the mutations comprise one or more of: instructing the routing engine not to perform a function on the at least one population of paths; instructing the routing engine to perform a computation on the at least one population of paths; instructing the routing engine to modify the at least one population of paths; instructing the routing engine to select a different population of paths to replace the at least one population of paths.

According to another embodiment of the invention, modifying the at least one population of paths comprises modifying one or more of: topology of the layer of the at least one population of paths; properties and/or services of the nodes and/or links of the layer of the at least one population of paths; interconnections of the nodes of the layer of the at least one population of paths.

According to another embodiment of the invention, the method further comprises: storing node constraint data for each node of the multi-layer network.

According to another embodiment of the invention, the method further comprises: storing link constraint data for each link of the multi-layer network.

According to another embodiment of the invention, the method further comprises: calculating the objective function based on one or more requirements.

According to another embodiment of the invention, the method further comprises: generating the plurality of multi-layer populations of paths are in parallel.

According to another embodiment of the invention, the method further comprises: generating the plurality of multi-layer populations of paths simultaneously.

According to another embodiment of the invention, the method further comprises: storing connections between the layers of the multi-layer network.

According to another embodiment of the invention, the method further comprises: storing data defining whether a layer can be skipped.

According to one embodiment of the invention, network simulation equipment for determining routes across a layer of a multi-layer system is provided. The network simulation equipment comprising: an adaptor module configured to convert a multi-layer system into a multi-layer network of nodes and links; a routing engine configured to determine a plurality of populations of paths, each population of paths corresponding to a route across a layer of the multi-layer network, and configured to assign resources to each of the plurality of populations of paths; and an objective function module configured to determine an objective function for each of the plurality of population of paths.

According to another embodiment of the invention, the routing engine further comprises: a directory storage module configured to store the plurality of populations of paths together with their associated objective functions.

According to another embodiment of the invention, the network simulation equipment further comprises: a plurality of routing engines configured to determine the plurality of populations of paths, and wherein the plurality of populations of paths are generated in parallel by the plurality of routing engines.

According to another embodiment of the invention, the plurality of populations of paths are generated simultaneously.

According to another embodiment of the invention, each routing engine is selected from the plurality of routing engines to determine the plurality of populations of paths for a layer of the multi-layer network based on the constraints of the nodes and links of the layer.

According to another embodiment of the invention, the network simulation equipment further comprises: a node linkage module configured to store node constraint data for each node of the multi-layer network.

According to another embodiment of the invention, the node constraint data comprises data regarding properties and/or services associated with each node.

According to another embodiment of the invention, the network simulation equipment further comprises: a link linkage module configured to store link constraint data for each link of the multi-layer network.

According to another embodiment of the invention, the link constraint data comprises data regarding properties and/or services associated with each link.

According to another embodiment of the invention, the route across a layer of the multi-layer network use properties and/or services from at least one other layer of the multi-layer network.

According to another embodiment of the invention, the objective function is calculated based on one or more requirements.

According to another embodiment of the invention, the requirements comprise one or more of: disjointedness; cost; utilisation; delay; speed; efficiency.

According to another embodiment of the invention, the routing engine further comprises: a layer mutation operators module configured to store mutation operations for application to the plurality of populations of paths.

According to another embodiment of the invention, the routing engine is further configured to mutate at least one population of paths of the plurality of populations of paths in accordance with the stored mutation operations upon receipt of instructions from an evolving module.

According to another embodiment of the invention, the mutation operations comprise one or more of: instructing the routing engine not to perform a function on the at least one population of paths; instructing the routing engine to perform a computation on the at least one population of paths; instructing the routing engine to modify the at least one population of paths; instructing the routing engine to select a different population of paths to replace the at least one population of paths.

According to another embodiment of the invention, modifying the at least one population of paths comprises one or more of: modifying topology of the layer of the at least one population of paths; modifying the properties and/or services of the nodes and/or links of the layer of the at least one population of paths; modifying interconnections of the nodes of the layer of the at least one population of paths.

According to another embodiment of the invention, the routing engine is further configured to create a matrix of candidate paths from a first node to a second node for each layer of the multi-layer network, and to select candidate paths from the matrix in order to determine the plurality of populations of paths for each layer of the multi-layer network.

According to another embodiment of the invention, the network simulation equipment further comprises: a multi-layer scenarios module configured to store connections between the layers of the multi-layer network.

According to another embodiment of the invention, each node comprises a terminal point or an intersection point of the multi-layer network.

According to another embodiment of the invention, each link comprises a connection between two or more nodes.

According to another embodiment of the invention, each link comprises a uni-directional link or a bi-directional link.

According to another embodiment of the invention, the multi-layer system comprises a multi-layer system of IP routers; a multi-layer system of roads; a multi-layer telephone communication system; a multi-layer utility distribution system; a multi-layer system of blood vessels; a multi-layer system for dataflow; a multi-layer system for social interaction.

According to one embodiment of the invention, a method of operating network simulation equipment for determining routes across a layer of a multi-layer system is provided. The method comprising: converting a multi-layer system into a multi-layer network of nodes and links; determining a plurality of populations of paths, each population of paths corresponding to a route across a layer of the multi-layer network; assigning resources to each of the plurality of population of paths; and determining at least one objective function for each of the plurality of population of paths.

According to another embodiment of the invention, the method further comprises: storing the plurality of populations of paths together with their associated objective functions in a directory storage module.

According to another embodiment of the invention, a plurality of routing engines determine the plurality of populations of paths, and the method further comprises: generating the plurality of populations of paths in parallel.

According to another embodiment of the invention, the method further comprises: generating the plurality of populations of paths simultaneously.

According to another embodiment of the invention, the method further comprises: selecting a routing engine from the plurality of routing engines for determining the plurality of populations of paths for a layer of the multi-layer network based on constraints of the nodes and links of the layer.

According to another embodiment of the invention, the method further comprises: storing node constraint data for each node of the multi-layer network in a node linkage module.

According to another embodiment of the invention, the method further comprises: storing link constraint data for each link of the multi-layer network in a link linkage module.

According to another embodiment of the invention, the method further comprises: calculating the objective function based on one or more requirements.

According to another embodiment of the invention, the method further comprises: storing mutation operations for application to the plurality of populations of paths in a layer mutation operators module.

According to another embodiment of the invention, the method further comprises: mutating at least one population of paths of the plurality of populations of paths in accordance with the stored mutation operations upon receipt of instructions from an evolving module.

According to another embodiment of the invention, the mutation operations comprise one or more of: performing a function on the at least one population of paths; performing a computation on the at least one population of paths; modifying the at least one population of paths; selecting a different population of paths to replace the at least one population of paths.

According to another embodiment of the invention, modifying the at least one population of paths comprises one or more of: modifying topology of the layer of the at least one population of paths; modifying properties and/or services of the nodes and/or links of the layer of the at least one population of paths; modifying interconnections of the nodes of the layer of the at least one population of paths.

According to another embodiment of the invention, the method further comprises: creating a matrix of candidate paths from a first node to a second node for each layer of the multi-layer network, and to select candidate paths from the matrix in order to determine the plurality of populations of paths for each layer of the multi-layer network.

According to another embodiment of the invention, the method further comprises: a multi-layer scenarios module configured to store connections between the layers of the multi-layer network.

According to one embodiment of the invention, an article of manufacture comprising: a machine readable storage medium; and executable program instructions embodied in the machine readable storage medium that when executed by a programmable system cause the system to perform functions that determine routes across a multi-layer system is provided. The functions comprising: converting a multi-layer system into a multi-layer network of nodes and links; determining a plurality of populations of paths, each population of paths corresponding to a route across a layer of the multi-layer network; determining a plurality of multi-layer populations of paths, each multi-layer population of paths corresponding to a route across the multi-layer network and comprising populations of paths for at least two different layers of the multi-layer network selected from the plurality of populations of paths; mating at least two multi-layer populations of paths from the plurality of multi-layer populations of paths to create a third multi-layer population of paths.

According to one embodiment of the invention, an article of manufacture comprising: a machine readable storage medium; and executable program instructions embodied in the machine readable storage medium that when executed by a programmable system cause the system to perform functions that evolve routes across a multi-layer network of nodes and links is provided. The functions comprising: selecting a first multi-layer population of paths from a plurality of multi-layer populations of paths, each multi-layer population of paths corresponding to a route across the multi-layer network and comprising populations of paths for at least two different layers of the multi-layer network; selecting a second multi-layer population of paths from the plurality of multi-layer populations of paths; mating the first and second multi-layer population of paths to create a third multi-layer population of paths; assigning resources to the third multi-layer population of paths; and determining at least one objective function of the third multi-layer population of paths.

According to one embodiment of the invention, an article of manufacture comprising: a machine readable storage medium; and executable program instructions embodied in the machine readable storage medium that when executed by a programmable system cause the system to perform functions that creates a Genepool of routes across a multi-layer network of nodes and links is provided. The functions comprising: determining a plurality of multi-layer populations of paths, each multi-layer population of paths corresponding to a route across the multi-layer network and comprising a population of paths corresponding to a route across a layer of the multi-layer network for at least two different layers of the multi-layer network; mutating each of the plurality of multi-layer population of paths; assigning resources to each of the plurality of multi-layer population of paths; determining an objective function for each of the plurality of multi-layer population of paths; and storing the plurality of multi-layer population of paths in a Genepool associated with their determined objective function.

According to one embodiment of the invention, an article of manufacture comprising: a machine readable storage medium; and executable program instructions embodied in the machine readable storage medium that when executed by a programmable system cause the system to perform functions that creates Genepool of routes across a multi-layer network of nodes and links is provided. The functions comprising: determining a plurality of multi-layer populations of paths, each multi-layer population of paths corresponding to a route across the multi-layer network and comprising a population of paths corresponding to a route across a layer of the multi-layer network for at least two different layers of the multi-layer network; mutating each of the plurality of multi-layer population of paths; assigning resources to each of the plurality of multi-layer population of paths; determining an objective function for each of the plurality of multi-layer population of paths; and storing the plurality of multi-layer population of paths in a Genepool associated with their determined objective function.

According to one embodiment of the invention, an article of manufacture comprising: a machine readable storage medium; and executable program instructions embodied in the machine readable storage medium that when executed by a programmable system cause the system to perform functions that determine routes across a layer of a multi-layer system is provided. The functions comprising: converting a multi-layer system into a multi-layer network of nodes and links; determining a plurality of populations of paths, each population of paths corresponding to a route across a layer of the multi-layer network; assigning resources to each of the plurality of population of paths; and determining at least one objective function for each of the plurality of population of paths.

According to one embodiment of the invention, a computer program product comprising programme code means for performing the methods described above is provided.

According to one embodiment of the invention, a computer readable medium recorded with computer readable code arranged to cause a computer to perform the methods described above is provided.

According to one embodiment of the invention, a computer programme code means for performing the methods described above is provided.

According to one embodiment of the invention, the network simulation equipment described above comprises a computer system.

BRIEF DESCRIPTION OF THE FIGURES

For a better understanding of the invention and as to how the same may be carried into effect reference will now be made, by way of example only, to the accompanying figures, in which:

FIG. 4 illustrates another multi-layer network;

FIG. 5C illustrates another route across the translated multi-layer network of FIG. 5B;

FIG. 6 illustrates a route comprising several links and nodes between two layers of a multi-layer network;

FIG. 7 illustrates an independent multi layer process;

DETAILED DESCRIPTION

Additional advantages and novel features of the invention will be set forth in part in the description which follows, and in part will become apparent to those skilled in the art upon examination of the following and accompanying figures or may be learned by practice of the invention.

Figure 1:
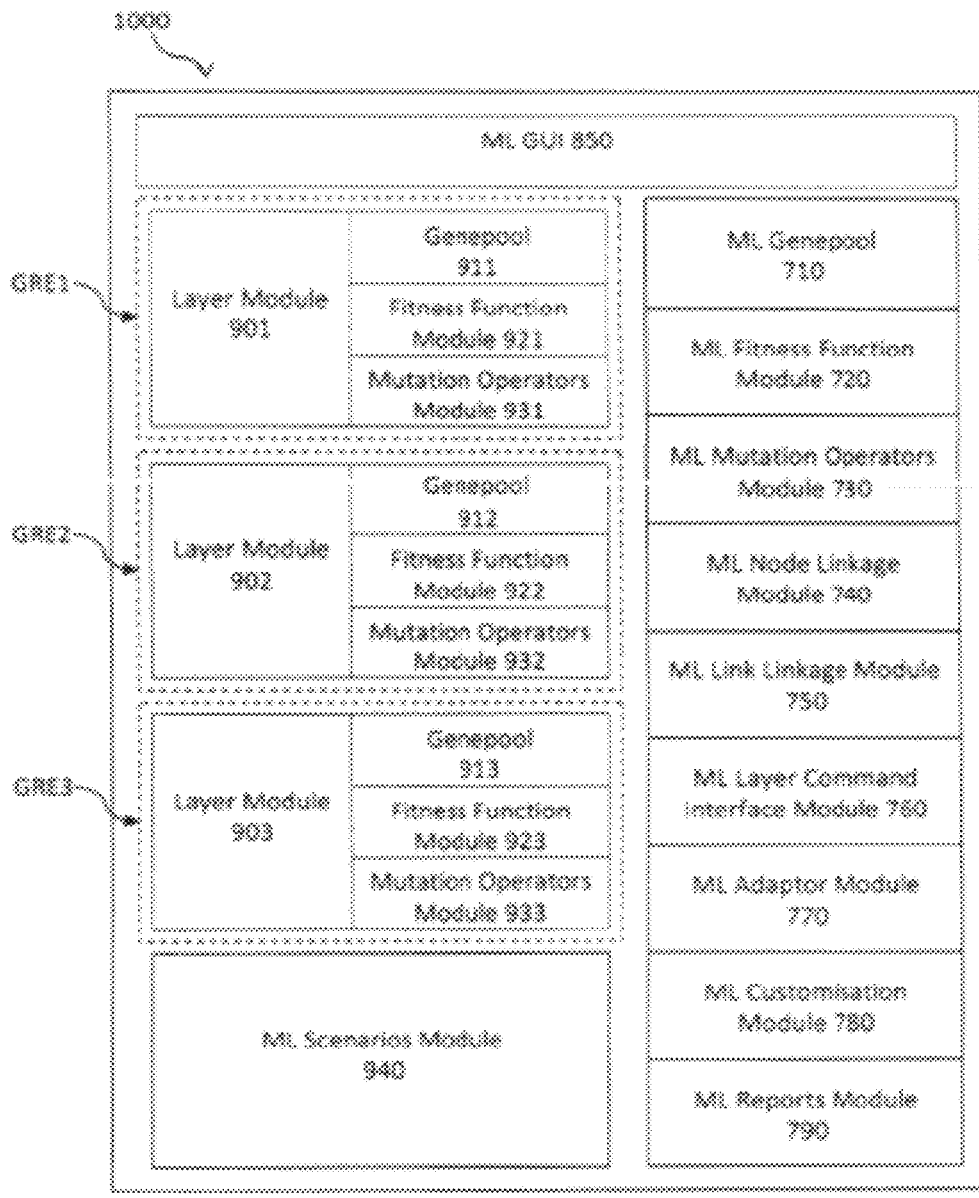
FIG. 1 illustrates apparatus for determining at least one "best" route across a translated multi-layer network.

FIG. 1 illustrates schematically apparatus 1000 for determining at least one "best" route across a translated multi-layer network. The apparatus 1000 comprises: a multi-layer graphical user interface (ML GUI) 850, a plurality of layer modules 901, 902, 903, . . . , 90n, which store data regarding layers (such as the nodes and links of each layer and the properties and/or services of each node and link). Each layer module 901, 902, 903, . . . , 90n, has access to a layer Genepool 911, 912, 913, . . . , 91n; a layer Fitness Function module 921, 922, 923, . . . , 92n; and a layer mutation operators module 931, 932, 933, . . . , 93n. The layer Genepools 911, 912, 913, . . . , 91n (equivalent to the Genepool 13 described below with reference to FIG. 9) each store a collection of populations of paths applying to a layer. The layer Fitness Function modules 921, 922, 923, . . . , 92n, each store layer Fitness Function data (determined at step 1337 of FIG. 9 below) relating to each population of paths across a layer. The mutation operators modules 931, 932, 933, . . . , 93n store standard mutation operations, deemed suitable by a skilled person, which can be applied to the data of the layers.

The apparatus 1000 also comprises a multi-layer scenarios module 940 which stores the connections between the layers in the multi-layer network. The multi-layer scenarios module 940 may also define whether the resources of each layer must be utilised, and whether a layer can be skipped. For example, the plurality of multi-layer population of paths 1400A-1400D, of FIG. 11 below, are each illustrated as comprising a layer 1, a layer 2 and a layer 3; this numeral annotation is used to indicate that each multi-layer comprises three layers, not that the three layers must be sequential layers. Depending on the network, for example, it may be possible skip layers and thus have a multi-layer network comprising a first layer and third layer, and no second layer, or first layer, second layer and fourth layer without a third layer etc. In addition, each multi-layer may comprise more, or less than three layers, for example two layers or four layers etc.

The combination of a layer module $901, 902, 903, \ldots, 90n$; a layer Genepool $911, 912, 913, \ldots, 91n$; a layer Fitness Function module $921, 922, 923, \ldots, 92n$; and a layer mutation operators module $931, 932, 933, \ldots, 93n$ may be considered a Generic Routing Engine (GRE) for each layer. Therefore, for example, the layer module 901, the layer Genepool 911, the layer Fitness Function module 921, and the layer mutation operators module 931 form a layer 1 Generic Routing Engine; the layer module 902, the layer Genepool 912, the layer Fitness Function module 922, and the layer mutation operators module 932 form a layer 2 Generic Routing Engine, and so on.

Furthermore, the apparatus 1000 comprises a multi-layer Genepool 710, a multi-layer Fitness Function module 720, a multi-layer mutation operators module 730, a multi-layer node linkage module 740, a multi-layer link linkage module 750, a multi-layer command interface module 760, an adaptor module 770, a customisation module 780, and a reports module 790.

The ML Genepool 710 (equivalent to the ML Genepool 14 described below with reference to FIG. 11) stores a collection of multi-layer populations of paths. The ML Fitness Function module 720 stores the Fitness Function (determined at step 1470 of FIG. 11 below) of each multi-layer population of paths. The ML mutation operators module 730 stores standard mutation operators, deemed suitable by a skilled person, which can be applied to the multi-layers. The ML node linkage module 740 stores data regarding the properties of each node. The ML link linkage module 750 stores data regarding the properties of each link.

The ML layer command interface module 760 enables the assigned engine to apply the appropriate commands ("Fix", "Compute", "Modify" or "Select" explained in further detail below) to the layers. The adaptor module 770 is a flexible framework for importing and exporting data and translates a system into a network of nodes and links. The adaptor module 770 enables integration with one or more data sources (network equipment, network management systems, operational support systems, spreadsheets etc.). In one embodiment, the adaptor module 770 may be iAdapt by Aria Networks.

The customisation module 780 is a customisation framework that enables the apparatus to be customised and configured to meet specific planning and optimisation tasks, enables automation of tasks that need to be performed on a regular basis, and supports a powerful data transformation and manipulation capability. In one embodiment, the customisation module 780 may be iCustomise by Aria Networks.

Finally, the reports module 790 provides reports regarding the multi-layer network. In one embodiment, the reports module 790 is provided using iReports by Aria Networks.

Figure 2:
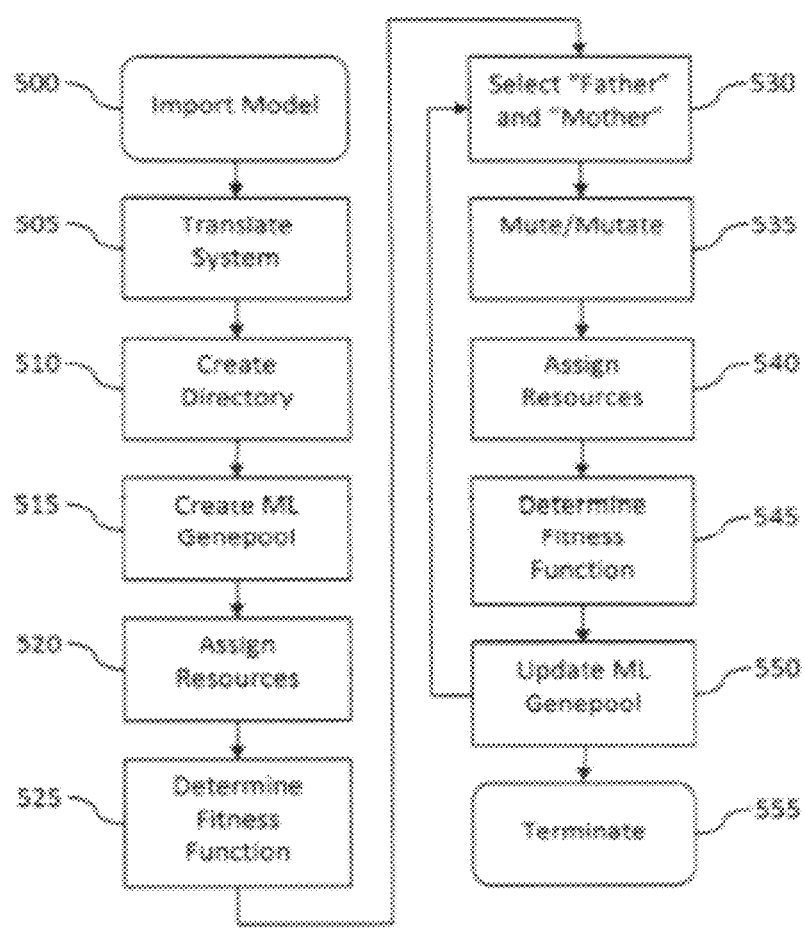
FIG. 2 illustrates a process for determining at least one "best" route across a translated multi-layer network.

FIG. 2 illustrates a process for determining at least one "best" route across a translated multi-layer network. At step 500 a system is imported, in one embodiment into the apparatus of FIG. 1. The system is translated into a network of nodes and links at step 505 and a directory of populations of paths for the layers of the multi-layer network is generated at step 510. A multi-layer Genepool is then created at step 515 using entries from the directory created at step 510. The ML Genepool comprises a plurality of candidate populations of paths for the translated multi-layer network. Resources are assigned to each entry in the ML Genepool at step 520 and a Fitness Function is then determined for each entry in the ML Genepool at step 525. Steps 500 to 525 may be considered collectively as a seeding process.

At step 530 a "Father" entry (candidate population of paths) and a "Mother" entry (candidate population of paths) is selected from the ML Genepool. The "Father" and "Mother" entries are then mated/mutated (explained in further detail below) at step 535 to create a "Child" entry (candidate population of paths). At step 540 resources are assigned to the "Child" entry, and a Fitness Function is determined for the "Child" entry at step 545. Finally, the ML Genepool is updated at step 550 with the new "Child" entry. The process can then return to step 530 from the selections of another "Father" and "Mother" entry, or the process can be terminated at step 555. Steps 530 to 550 may be considered collectively as the evolving steps.

Further detail of the above described apparatus and process will now be provided. In general, the exemplary apparatus and methods described below build a reusable model chosen from a set of potential models, which can be applied to any network topology and service request. The model can be used to determine one or more optimum routes across a multi-layer network. The models may be generated using a GRE (Generic Routing Engine).

Figure 3:
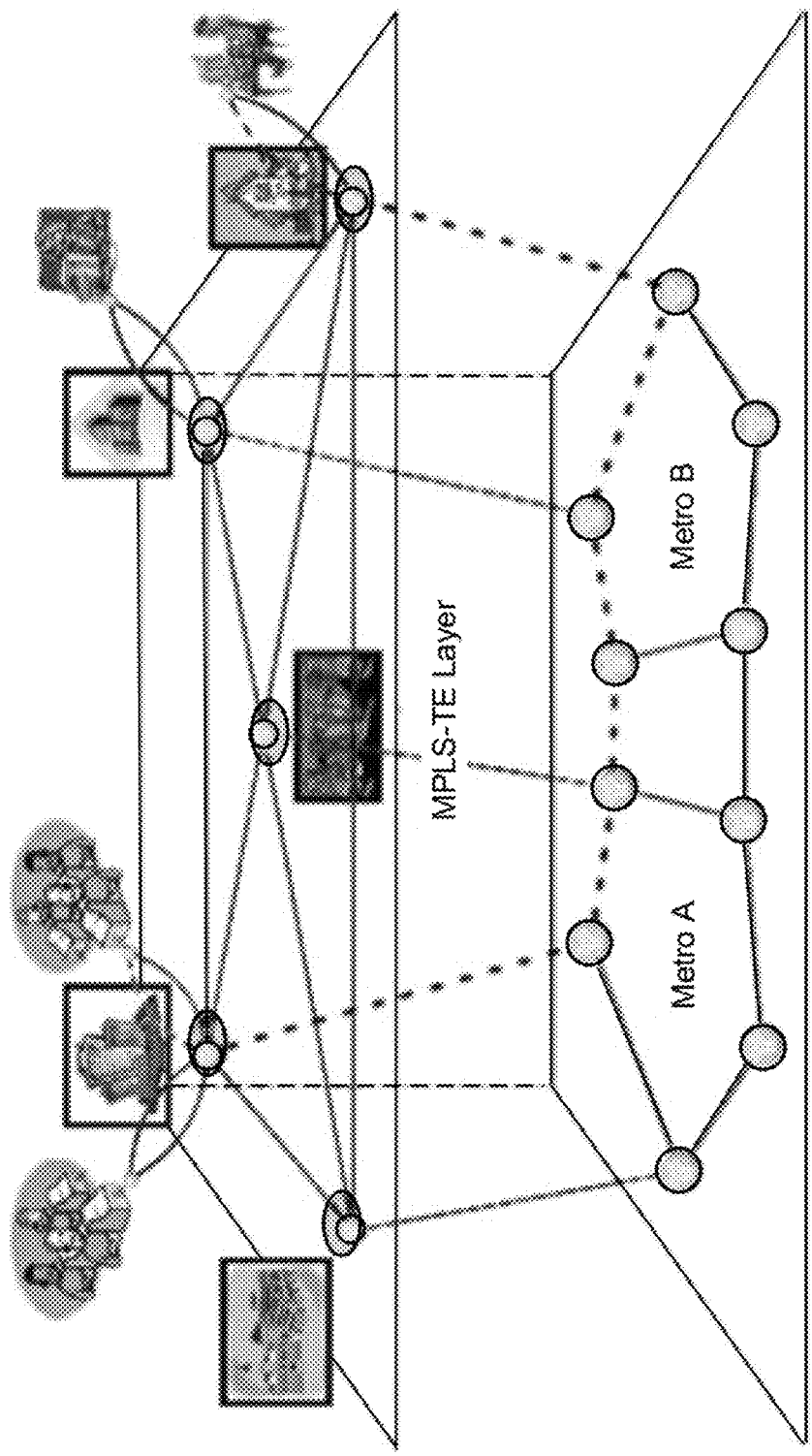
FIG. 3 illustrates a multi-layer network.

FIG. 3 illustrates one example of a multi-layer system/network, the network of FIG. 3 being for the transfer of data. In particular, FIG. 3 illustrates a Multiprotocol Label Switching-Traffic Engineering (MPLS-TE) layer 70A and a Time-Division Multiplexing (TDM) layer 70B. The MPLS-TE layer 70A transfers data between Wide Area Network (WAN) nodes 71, using links 73, 75. The links ending with a suffix "a" indicate the route chosen to transfer data in this instance. The transfer of data is limited by the components of the network, for example the capacity of the IP routers and the bandwidth of the connections.

FIG. 4 illustrates another multi-layer system/network. FIG. 4 illustrates that each layer utilises properties and/or service of other layers. The link in layer X+1 (the MPLS-TE network layer) is supported by a service placed in layer X (the optical network layer), the transport service. The aggregated properties of the transport service (e.g. bandwidth, cost, delay etc.) become the properties of the Layer X+1 link. Transport services on layer X+1 could provide links in layer X+2 (Mobile Network). In this way a connected multi-layer network can be constructed.

FIGS. 3 and 4 illustrate examples of multi-layer systems/networks before they have being translated by the apparatus of the present invention into a network of nodes an links.

In addition, while FIGS. 3 and 4 illustrate examples of multi-layer systems/networks for the transfer of data, a multi-layer network may be a network of physical objects, such as a network of IP routers, a network of roads, a telephone communication system, a utility distribution system, or a network of blood vessels. Alternatively, a multi-layer network may be a network of abstract objects, such as dataflow or social interaction. In all such instances, the components and connections of the components have properties. For example, in the case of roads the properties may be the length and type of road such as a motorway or A road, etc. Each components and connections of the components may also have associated costs and delays.

A multi-layer network may comprise layers of different network types/technologies.

As stated above, the exemplary apparatus and methods build a reusable model for a system/network that can be used in order to determine the "best" solution for a route across the network, the best solution being a population of paths across the network, (selected from a plurality of populations of paths) based on objective functions. One useful category of objective functions is "fitness tests", the population of paths having the highest fitness being considered to be the "best" solution. The best solution may be classified as the population of paths having the shortest length, and/or the lowest cost, and/or the greatest speed etc., depending on the requirements of the network. Multiple requirements (e.g. distance, cost, and speed etc.) may be applied in order to determine the best solution. For example, if the requirement is cost, then the best solution based on cost alone may be a population of paths A (which is very cheap but also slow), whereas if the requirements are cost and speed, then the best solution may be a population of paths B (which is more expensive than population of paths A, but also faster then population of paths A), so a best solution for the combination of cost and speed.

Figure 5A:
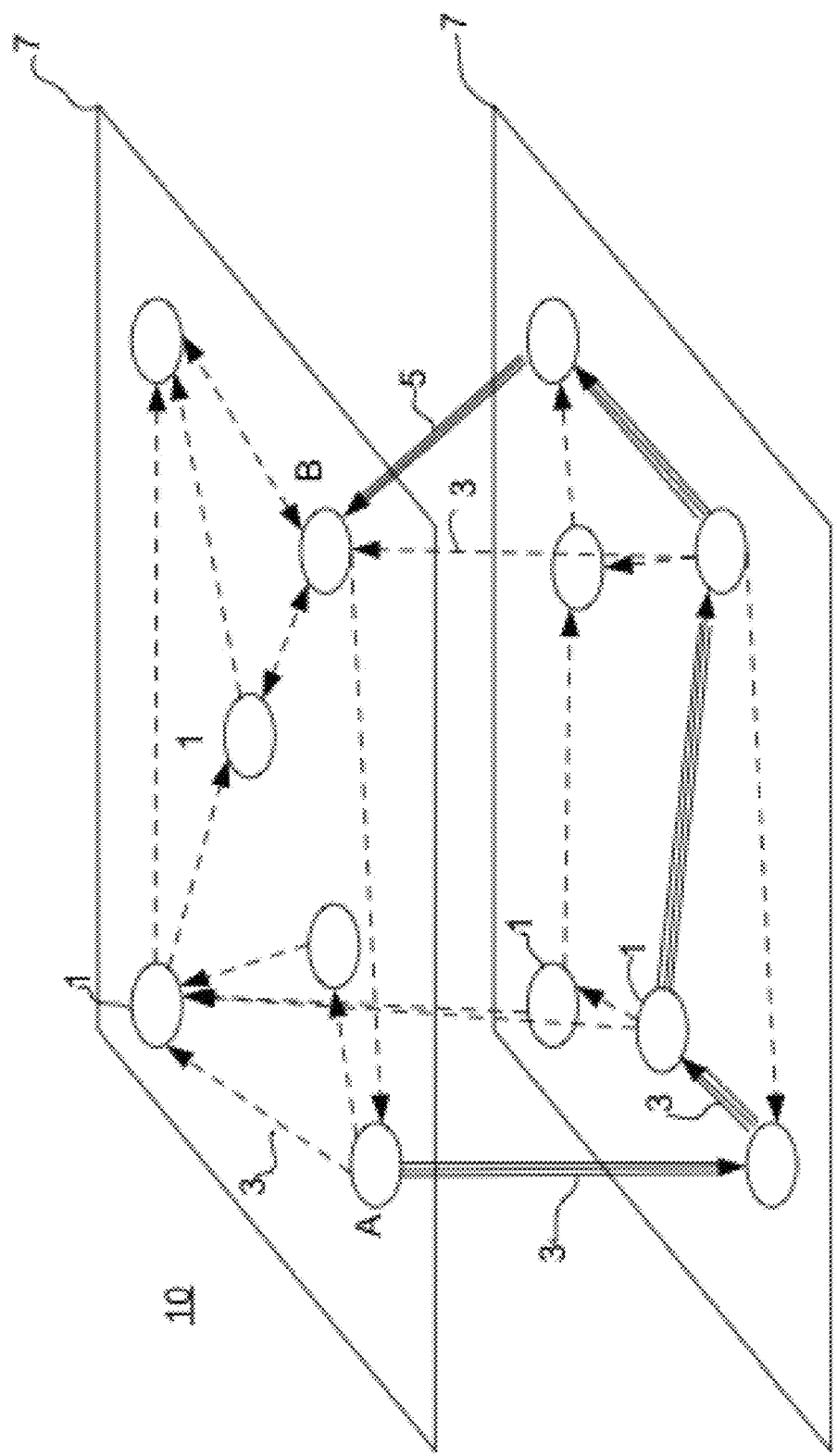
FIG. 5A illustrates a route across a translated multi-layer network.
Figure 5B:
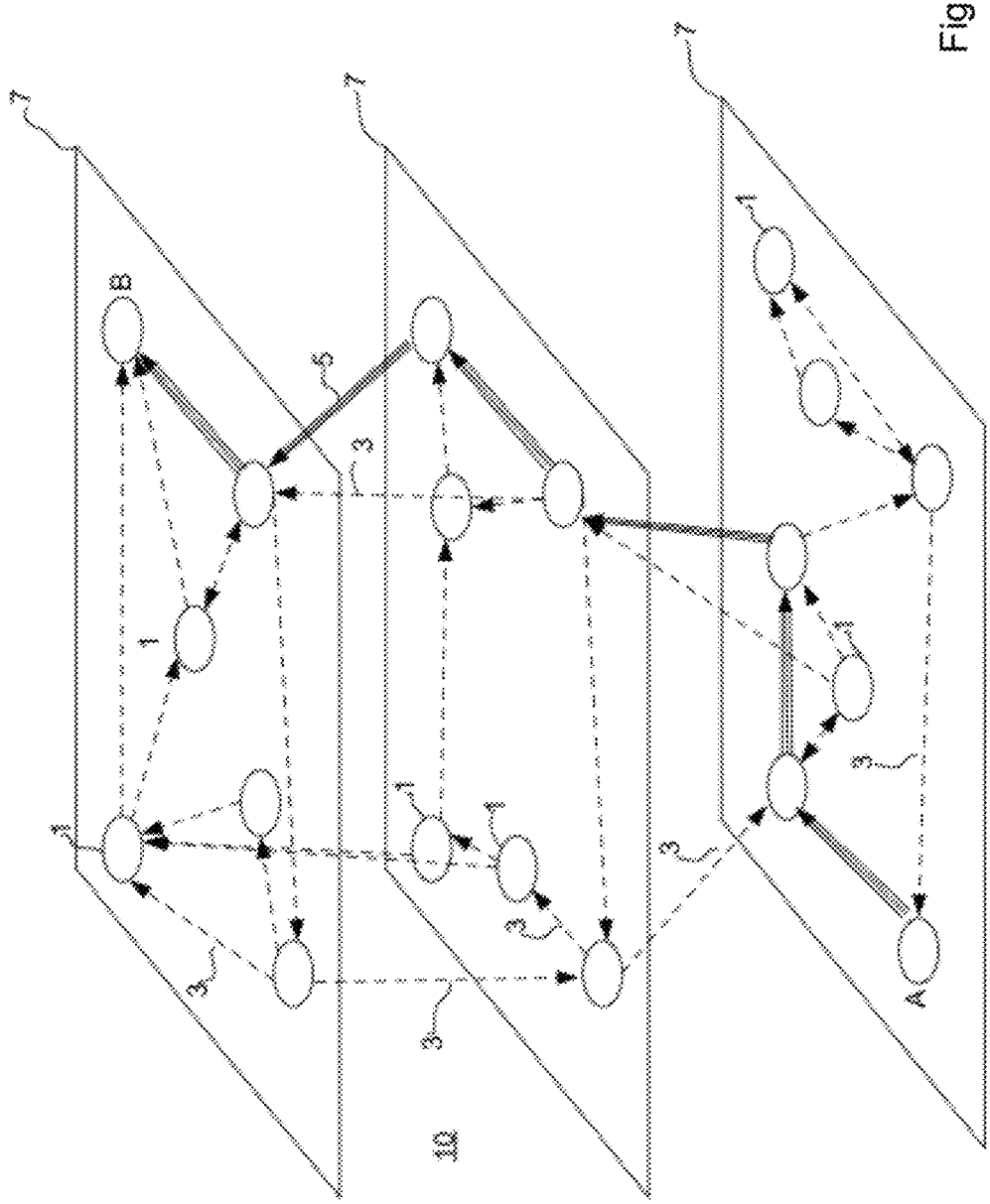
FIG. 5B illustrates another route across a translated multi-layer network.

With reference to FIGS. 5A to 5C, a multi-layer system/network may be modelled as (translated into) a plurality of layers 7, each layer having a plurality of nodes 1 and links 3.

A node 1 represents a terminal point or an intersection point of a network. It is the abstraction of a location such as an IP router, optical switch, wireless bay station, circuit patch, utility station, city road intersection, transport terminal, or the like.

A link 3 represents the connection between two nodes 1. A link 3 is the abstraction of a transport infrastructure supporting movements between nodes 1 constraining the flow of objects (whether physical or abstract), such as data, wavelength, water, cars, patients and the like. Links have a direction that is represented as an arrow and can be uni-directional or bi-directional.

Each node 1 and link 3 may have associated constraints, i.e. multiple properties and/or services which can be consumed. For example in a telephone communication network the link 3 may have associated bandwidth (and other properties and/or services) which can be consumed. The network is modelled as a plurality of nodes 1 and links 3 in order to simplify the process of determining a path between two points in the network. In a multi-layer network, a path routed across one layer may use properties/services from another layer. Therefore, the aim is to optimise the route across each layer in order to optimise the properties and/or service of the multi-layer network, as a whole.

FIG. 5A illustrates a path 5 between node A and node B across a network. FIG. 5B illustrates a path 5 between node A and node B across a network, and FIG. 5C illustrates another possible path 5 across a network from node A to node B.

As is apparent from looking at the FIGS. 5A to 5C that a plurality of paths 5 are possible across the layers 7 of the network 10 from node A to node B, each path 5 having different constraints based on the nodes 1 and links 3 used. In addition, each path 5 will have different results. For example the path 5 illustrated in FIG. 5B is shorter than the path 5 illustrated in FIG. 5C. However, the path 5 illustrated in FIG. 5B may cost more than the path 5 illustrated in FIG. 5C, depending on the properties/services used.

FIG. 6 illustrates a further multi-layer network 10. FIG. 6 illustrates that it is possible to have a plurality of nodes 1 and links 3 linking two layers 7 of a network 10.

For a path 5 to exist between two nodes 3 it must be possible to travel an uninterrupted sequence of links 3. Some examples of paths 5 of links 3 are a label switched path, a light path, a water flow path, a transport route etc. Requirement based routing is the determination of a path 5 across a network traversing the nodes 1 and links 3 to satisfy and/or optimise the resources of the network. For example summing the cost, not sharing resources, using specific types of sequences of nodes and links.

The layers 7 of a multi-layer network may represent separations of technology (e.g. packet switched capable (PCS), time division multiplex (TDM), lamda switch capable (LSC)), separation of data plane switching granularity levels (e.g. PCS-1 and PCS-2 or VC4 and VC12) or a distinction between different service partitions.

Predominantly multi-layer systems fall into two categories:
1) independent multi-layer; and
2) dependent multi-layer.

An independent multi-layer system/network comprises a plurality of layers, where the route across each layer is independent of the link between the layers, i.e. regardless of how two layers are linked, the path across each layer is not altered as a result of the link between the two layers. A request for extra resources becomes a service request to the layer below.

A dependent multi-layer network comprises a plurality of layers, where the path across each layer is dependent on the link between the layers, i.e. the path across each layer may need to be altered as a result of the link between the two layers. This is because the resources in one layer impact the path across a higher layer which in turn impact the optimisation of the lower layer. Dependent multi-layer networks can be characterised as a single topology with sets of network elements grouped by their properties and constraints but exemplary embodiments process them as a global optimisation.

Independent multi-layer networks propagate faults from lower layers into upper layers and satisfy service requests from higher layers to lower layers. This is in practice a faults up, service down (FUSD) arrangement. FIG. 7 illustrates an independent multi-layer process. At step 400 a service request in made in layer 3 (the highest layer in this example). It is determined if the required resources are available in layer 3 at step 405. If the required resources are available in layer 3, then a path is computed at step 410 and the topology of layer 3 is updated at step 415. If the required resources are not available in layer 3, then the service request is passed to layer 2 as step 425. It is then determined if the required resources are available in layer 2 at step 430. If the required resources are available in layer 2, then a path is computed at step 435 and the topology of layer 2 is updated at step 440. If the required resources are not available in layer 2, then the service request is passed to layer 1 as step 450. A path is computed at step 455 and the topology of layer 1 is updated at step 460.

If a fault is generated in layer 1 at step 465, this is passed up to layer 2, resulting in the layer 2 topology being updated at step 440, whilst if a fault is generated in layer 2 at step 445, this is passed up to layer 3, resulting in the layer 3 topology being updated at step 415. In addition the shared risk groups (SRG's) are updated at step 470, 475. SRG's are a collection of nodes and links which share a common risk, for example if the service fails.

As can be seen from FIG. 7, if a service is not available in one layer, a request for the service is provided to the next (higher) layer, and the next layer, until the service request can be met. In addition, if a fault is generated in one layer, it directly effects computation of the lower layer path.

Exemplary embodiments approach dependent multi-layer networks in two ways:
1) iterative optimisation using genetic algorithms with a multi-objective fitness function; or
2) a single network with a single optimisation function.

The iterative optimisation technique requires a separate application to control the evolutionary application. The supervising Genetic Algorithm (GA) program attempts to optimise a path across each layer by repeatedly creating links/services and flowing results up/down. The GA learns how to aggregate Label Switched Paths (LSPs) into express links and how those express links are computed on the MPLS-TE layer. Paths are grouped into express link and the express links are then computed by the GRE in each individual layer In a single network approach the optimisation function is derived which treats all components as if they are part of one network.

There are three main steps executed by the GRE when determining the paths for a set of services:
1. Compute candidate population of paths;
2. Assign resources; and
3. Compute a fitness.

Figure 8:
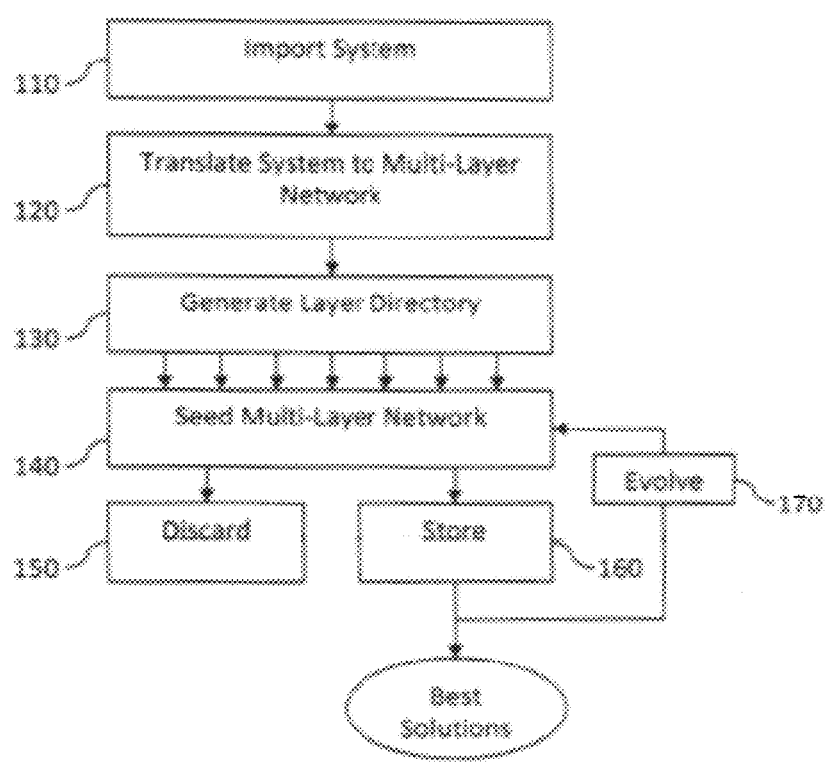
FIG. 8 illustrates a process for determining at least one "best" route across a translated multi-layer network.

FIG. 8 illustrates these three steps that are combined in this example to compute a solution, which involves seeding the solution (step 140) and then evolving the solution (step 170). In order to do this exemplary apparatus and methods record a population of candidate solutions (seeded solutions) and manipulate previous attempts and modifies their effect based on the effectiveness of various mutation operators (evolving the solution).

FIG. 8 illustrates a process for determining at least one "best" solution across a multi-layer network in accordance with constraints and requirements applying in the modelled system. As illustrated in FIG. 8, the system is imported at step 110 and translated into a multi-layer network of nodes 1 and links 3 at step 120. At step 130 a layer directory is generated. The generation of a layer directory involves the generation, for each layer of the multi-layer network, of a predetermined number of candidate populations of paths. The predetermined number is configurable based on application. Resources are assigned to the candidate populations of paths and a Fitness Function determined for each candidate populations of paths. The candidate populations of paths for each layer may be generated simultaneously. The candidate populations of paths for each layer are then used to seed a multi-layer network at step 140. Seeding of a multi-layer network in this way results in the generation of a predetermined number of candidate populations of paths for the multi-layer network.

Resources are assigned to the multi-layer populations of paths and a Fitness Function for each candidate multi-layer population of paths is determined. If the Fitness Function does not meet an acceptance criteria, then the candidate multi-layer population of paths is discarded at step 150. However, if the Fitness Function is above the acceptance criteria, then the candidate multi-layer population of paths is stored at step 160. The stored candidate multi-layer populations of paths are then evolved at step 170 until a predetermined numbers of acceptable multi-layer populations of path are determined.

Figure 9:
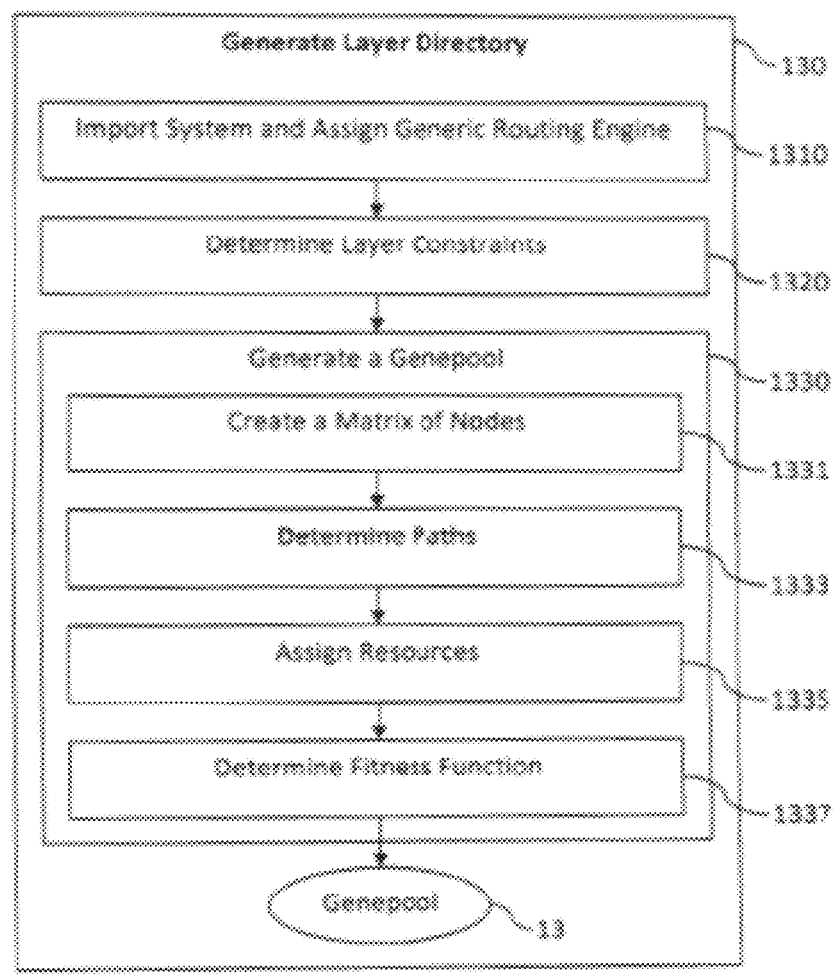
FIG. 9 illustrates a process for generating a layer network.

FIG. 9 illustrates in further detail the process of generating a layer directory (step 130 of FIG. 8). In the generation of a layer directory each layer is treated independently. At step 1310 multi-layer system data is imported and a generic routing engine is assigned to each layer of the multi-layer system. Importation of the multi-layer system data at step 1310 results in translation of each layer of the system into a defined network of nodes and links. A different engine (or the same engine) is assigned to each layer based on the constraints (properties/services) of each layer. The engine is capable of determining the candidate populations of paths across the layer. For example, in FIG. 3, an engine A could be assigned to the layer 70A capable of determining candidate populations of paths across the MPLS-TE layer 70A and an engine B, different from engine A could be assigned to layer 70B capable of determining candidate populations of paths across the TDM layer 70B.

The constraints applicable to each layer are then determined at step 1320. Determining the constraints involves determining the properties/services available for each node 1 and link 3 of each layer 7, and determining if each layer 7 is fixed or if it can evolve (e.g. whether any of the nodes 1 or links 3 of the layer 7 can be upgraded, and/or whether any nodes 1 or links 3 can be added or removed from the layer 7, changing the topology of the layer).

A Genepool 13 for each layer is then generated at step 1330. In this context, a Genepool may be regarded as a collection of candidate populations of paths 5 across each layer 7. The generation of a Genepool 13 involves the creation of a matrix of the nodes 1 of each layer 7 at step 1331 and the determination of a predetermined number (x), in one example 25, of candidate populations of paths across each layer (from node n to node m) at step 1333. The predetermined number x of candidate populations of paths which are calculated may be an arbitrary number provided based on the available memory. The generation of a matrix and determination of candidate populations of paths is explained with reference to FIGS. 10A and 10B.

Figure 10A:
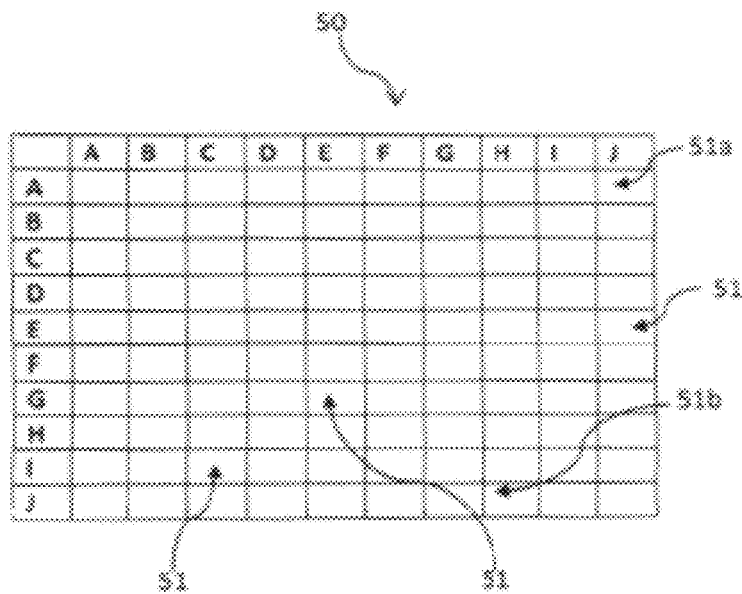
FIG. 10A illustrates a matrix for determining routes across a translated layer of a network.
Figure 10B:
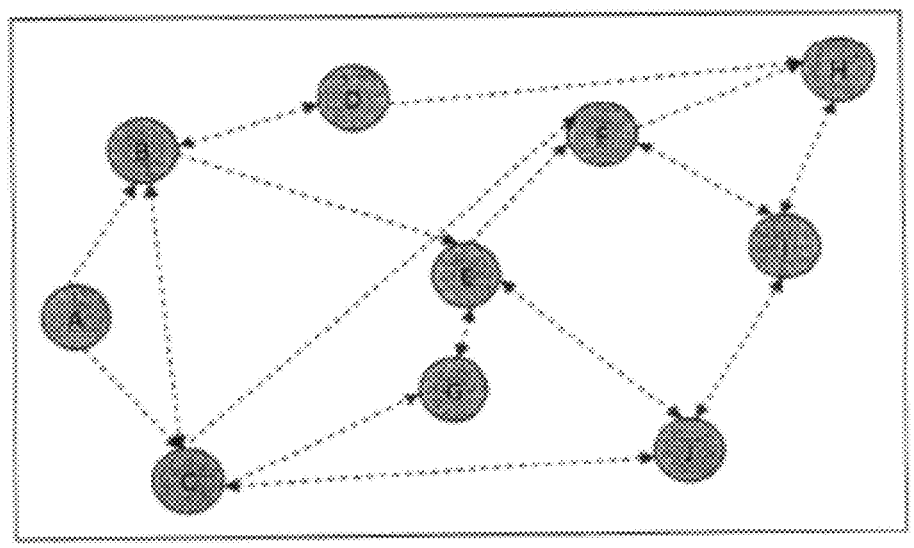
FIG. 10B illustrates a translated layer of a network.

FIG. 10A illustrates one example of a matrix 50 for determining candidate populations of paths across a layer of a network, such as the modelled layer illustrated in FIG. 10B. As can be seen in FIG. 10B the modelled layer comprises a plurality of nodes A-H connected via various links. A predetermined number of candidate populations of paths across each layer are then determined, for each pairing of nodes. The predetermined number of candidate populations of paths are stored at the intersection 51 of each pairing of nodes in the matrix 50. For example, at intersection 51a, x candidate populations of paths across the layer from node A to node J are stored, and at intersection 51b, x candidate populations of paths across the layer from node J to node H are stored.

One example of a candidate population of paths stored at intersection 51a, with reference to FIG. 10A, is: a path from node A to node B, a path from node B to node E, and a path from node E to node I, resulting in three (a population of) paths, which when combined route from node A to node J. Another example of a population of paths stored at intersection 51a, with reference to FIG. 10A, is: a path from node A to node D, a path from node D to node I, and a path from node I to node J, resulting in three (a population of) paths, which when combined route from node A to node J.

The properties and/or services associated with each node and each link of the paths which make up each population of paths contribute to the overall solution. The Fitness Function is determined for the three paths combined, which is the Fitness Function of the population of paths.

One example of a candidate population of paths stored at intersection 51b, with reference to FIG. 10A, is: a path from node J to node C, a path from node C to node F, and a path from node F to node H, resulting in three (a population of) paths, which when combined route from node I to node H. Another example of a population of paths stored at intersection 51b, with reference to FIG. 10A, is: a path from node J to node E, a path from node E to node I, and a path from node I to node H, resulting in three (a population of) paths, which when combined route from node J to node H.

Although several examples of population of paths have been given containing three paths, any number of paths, deemed suitable by a skilled person, can be provided in each population of paths. In addition, it is possible for populations of paths from and to the same nodes to have different numbers of paths.

In the matrix some of the candidate populations of paths may be partial solutions, some may be failed solutions and some may be complete solutions.

It is possible to use the matrix, once generated with a plurality of candidate populations of paths at each intersection, as a look-up directory for a plurality of different networks. In such cases, the properties and/or services associated with each link and node are altered in accordance with the networks for which the matrix is being used. For example, and without limitation, the matrix 50 could be used to determine the best solution for a network of roads, a telephone communication system, a utility distribution system, or a network of blood vessels etc.

The predetermined number of candidate populations of paths across each layer are determined at step 1333, with reference to the constraints determined at step 1320. In addition, the x candidate populations of paths across each layer 7 may be generated in parallel.

Resources are then assigned to each candidate population of paths at step 1335 and a Fitness Function for each candidate population of paths is determined at step 1337. As stated above each node and link has associated constraints, such as properties and/or services. When resources are assigned, this means that some or all of the nodes and links properties and/or services are consumed when the path is used. For example, a link may have a property of 16 Gbits bandwidth. The candidate path may have a resource requirement of 2 Gbits. Therefore, assigning resources at step 1335 results in assigning 2 Gbits of bandwidth to the candidate paths.

Finally, the x candidate populations of paths are stored in the Genepool 13 together with their determined Fitness Function for use in multi-layer seeding at step 140 of FIG. 8. The Genepool 13 can be considered a directory, from which candidate population of paths can be retrieved.

In one embodiment, the predetermined number (x) of candidate populations of paths is a minimum of two so that the two candidate populations of paths can be compared in order to identify the best solution.

Figure 11:
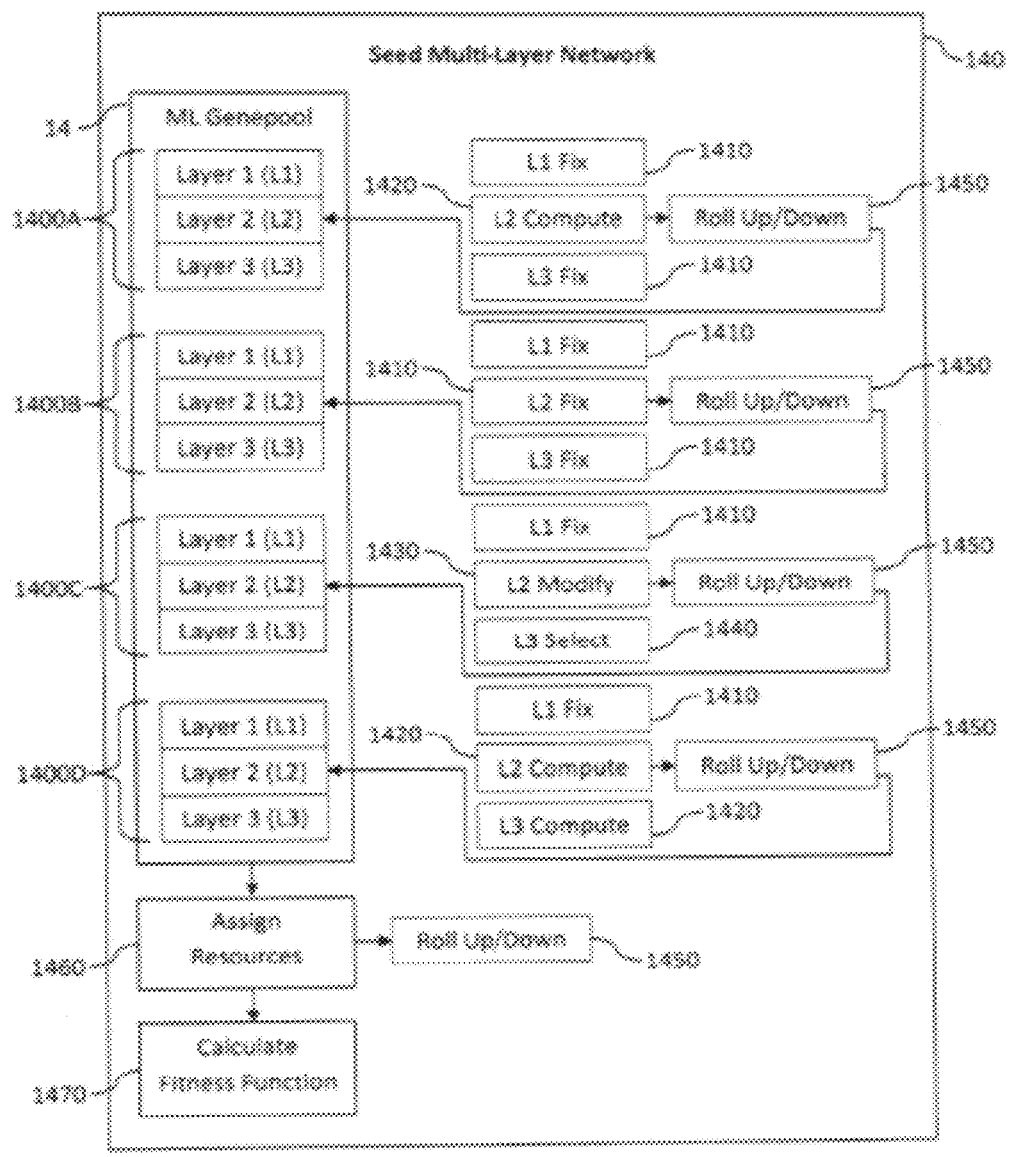
FIG. 11 illustrates a processes for seeding a translated multi-layer network.

FIG. 11 illustrates in further detail the processes of seeding a translated multi-layer network (step 140 of FIG. 8). A predetermined number (x) of potential multi-layer networks are created using the candidate populations of paths of each layer stored in the Genepool 13. For example, a multi-layer network may comprise three layers, layer 1 (L1), layer 2 (L2) and layer 3 (L3). Candidate multi-layer populations of paths 1400 are generated by selecting one L1 candidate population of paths, one L2 candidate population of paths and one L3 candidate population of paths from the Genepool 13. These candidate multi-layer populations of paths 1400 are stored in the Multi-Layer Genepool 14. The ML Genepool 14 comprises a collection of the candidate multi-layer population of paths for a multi-layer network.

It is possible to consider the ML Genepool 14 comprising a collection of candidate multi-layer populations of paths as to be equivalent to a multi-layer (ML) matrix, which once generated can be used as a look-up directory for a plurality of different networks. In such cases, the properties and/or services associated with each link and node are altered in accordance with the networks for which the matrix is being used. For example, and without limitation, the ML matrix could be used to determine the best solution for a network of roads, a telephone communication system, a utility distribution system, or a network of blood vessels etc.

As described above with reference to FIG. 9, each layer has an engine assigned at step 1310. A candidate multi-layer population of paths 1400 is selected from the ML Genepool 14 and a Multi-Layer engine (separate from the single layer GRE's GRE1, GRE2, GRE3 etc. assigned to each layer and describe above with reference to FIG. 1) analyses the candidate multi-layer population of paths 1400. The Multi-Layer (ML) engine determines whether to "Fix", "Compute", "Modify" or "Select" each layer of the candidate multi-layer population of paths 1400. The ML engine then commands the assigned engine of each layer to perform the determined function on that layer.

If the command is "Fix", then the assigned engine does not perform a function on the layer, since the layer is fixed. If the command is "Compute" then the assigned engine performs a computation on the layer in order to optimise the layer. If the command is "Modify" then the assigned engine modifies the layer, for example the assigned engine modifies the topology and/or the services and/or the interconnects of the layer. If the command is "Select" then the assigned engine selects (randomly) a different candidate population of paths for the same layer from the Genepool 13.

Roll Up/Down 1450 illustrates implementation by the assigned engine of the instruction from the ML engine. Roll up translates transport services in lower layers into links in upper layers and propagates up the appropriate service properties; Bandwidth, cost, delay, shared risk groups etc. Roll down passes down the layers the links traversed by services. In this way the modelled layers communicate the consumption of resources and the paths of services within a layer.

Following seeding of the plurality of candidate multi-layer populations of paths 1400, the resources required by each candidate multi-layer population of paths 1400 are assigned at step 1460, and the Fitness Function of each candidate multi-layer population of paths 1400 is determined at step 1470. The plurality of candidate multi-layer population of paths 1400 are then stored in the ML Genepool 14 with their associated Fitness Function.

In one embodiment, the plurality of candidate multi-layer populations of paths 1400A-1400D are analysed and processed in parallel.

The population of paths for each layer have been optimised for that layer, and the Fitness Function of each layer reflects this. However, the "best" solution (i.e. the population of paths having the highest Fitness Function) for a particular layer may not result in the "best" multi-layer solution when combined with other layers so that the whole modelled system is taken into account. Therefore, the commands "Fix", "Compute", "Modify" and/or "Select" are applied to the candidate populations of paths of each layer in order to optimise the candidate multi-layer populations of paths 1400.

Figure 12:
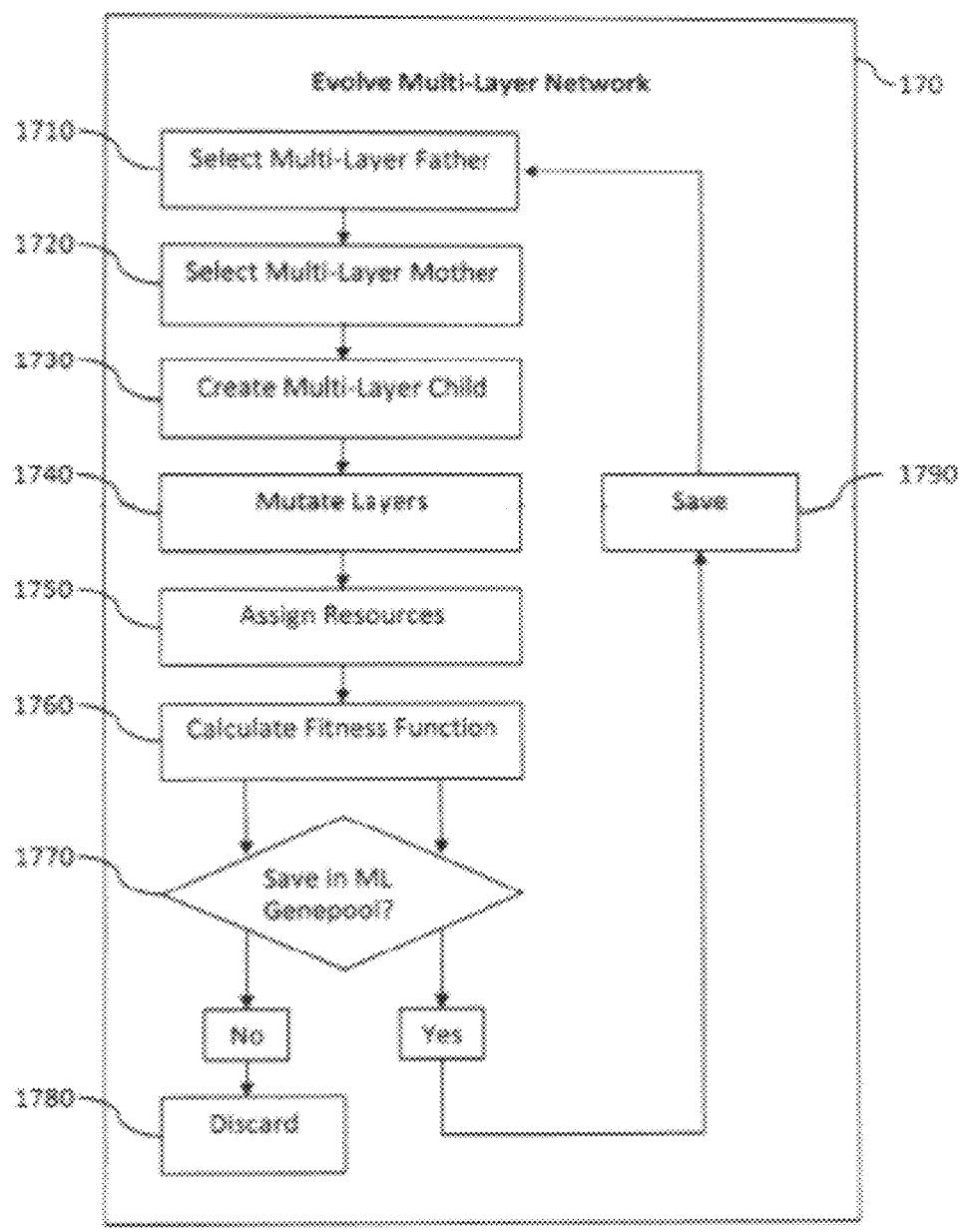
FIG. 12 illustrates a processes for evolving a translated multi-layer network.

As stated above, the candidate multi-layer populations of paths 1400 are evolved at step 170 of FIG. 8. FIG. 12 illustrates schematically a process for evolving the candidate multi-layer populations of paths in order to identify a predetermined number of the "best" multi-layer populations of paths solutions 1400.

A "father" multi-layer population of paths is selected from the multi-layer candidate populations of paths 1400 at step 1710 and a "mother" multi-layer population of paths is selected from the multi-layer candidate populations of paths 1400 at step 1720. Steps 1710 and 1720 can be performed in either order or simultaneously. The "father" and "mother" multi-layer populations of paths 1400 are selected, for example, based on their Fitness Function. The higher their Fitness Function, the more likely a candidate multi-layer population of paths is to be selected as a parent multi-layer population of paths (as a "father" or "mother" multi-layer population of paths). A "child" multi-layer population of paths is then created at step 1730 by mating the "father" and "mother" populations of paths. In this context mating means mathematically combining in a suitable way. One example of mating the "father" and "mother" populations of paths is swapping layers of the "father" and "mother" multi-layer populations of paths to create a "child" multi-layer population of paths. Another example of mating the "father" and "mother" populations of paths is to overlay the two populations of paths to determine the similarities and differences, and then to select some of the similarities and differences to create a "child" multi-layer population of paths. The "child" multi-layer population of paths is mutated at step 1740 by applying one of the commands "Fix", "Compute", "Modify" or "Select" to the layers, as in the seeding process.

Following mutation, the required resources are assigned to the "child" multi-layer population of paths at step 1750 and the Fitness Function of the "child" multi-layer population of paths is calculated at step 1760.

Based on the Fitness Function of the "child" multi-layer population of paths, it is determined at step 1770 whether to save the "child" multi-layer population of paths in the ML Genepool 14. If the Fitness Function of the "child" multi-layer population of paths is worse than the worst Fitness Function of the plurality of candidate multi-layer populations of paths already stored in the ML Genepool 14, then the "child" multi-layer population of paths is discarded at step 1780. However if the Fitness Function of the "child" multi-layer population of paths is better than the worst Fitness Function of the plurality of multi-layer populations of paths already stored in the ML Genepool 14, then the "child" multi-layer population of paths is saved at step 1790.

The process of evolving the multi-layer network is performed numerous times with a set of mutations applied randomly or in a controlled way, such that the "best" multi-layer populations of paths solutions are identified and stored in the ML Genepool 14, such that the ML Genepool 14 is updated. Finally, post process cleanup may be performed if required.

The Fitness Function defines what is a "good" solution, e.g. for MPLS-TE, IP, WDM (Wavelength-Division Multiplexing). In one embodiment, it weights the various constraints, such as cost and delay for TE, OSNR (Optical Signal Noise Ratio) for optical, administrative costs for IP or some financial cost for resource constraints.

The Fitness Function may be a number between 0 and 1. A high Fitness Function being 1 and a poor Fitness Function being 0 (or vice versa if required). The Fitness Function is determined based on weightings applied to the populations of paths as a result of compliance with the requirements of the route, say if the population of paths is desired to be cheap and/or quick for example.

One example of a Fitness Function is a Disjointedness Fitness Function which determines whether a candidate population of paths shares any links and/or nodes. The more links and/or nodes that the population of paths shares, the lower that population of paths Disjointedness Fitness Function. One way to determine the Disjointedness Fitness Function (DFF) of two populations of paths, involves counting the number of nodes in the first population of paths (PP1), counting the number of nodes in the second population of paths (PP2), counting the number of nodes that are shared between the two populations of paths, and applying the formula $DFF=1-(N_S \div (N_{PP1}+N_{PP2}))$. For example, if PP1 has 5 nodes ($N_{PP1}=5$), PP2 has 5 nodes ($N_{PP2}=5$), and PP1 and PP2 share 2 nodes ($N_S=2$), then the Disjointedness Fitness Function is: $1-(2\div(5+5))=0.8$. Alternatively, if PP1 and PP2 share 0 nodes ($N_S=0$), then the Disjointedness Fitness Function is: $1-(0\div(5+5))=1$.

There may be a plurality of different Fitness Functions calculated based on the requirements of the system, for example there may be a Cost Fitness Function, a Utilisation Fitness Function, a Delay Fitness Function, a Speed Fitness Function, an Efficiency Fitness Function etc. With regard to the Cost and Speed Fitness Function, the lower the cost or speed the higher the Fitness Function.

The ML Genepool 14 may comprise a plurality of multi-layer candidate populations of paths. As a result of the evolving process, the multi-layer populations of paths will have converged to multi-layer candidate populations of paths having a relatively high Fitness Function.

When determining the Cost Fitness Function the sum of all the costs of each path over all services may be determined and then normalised. This ensures that a single node is not penalised. The same normalisation takes place with regards to other constraints and properties to normalise the properties consumed, for example to the Delay Fitness Function and Disjointedness Fitness Function etc.

Referring again to FIG. 1, the ML node linkage module 740 stores data regarding the properties of each node. In one example, the ML node linkage module 740 may comprise a connection to a look-up table such as Table 1 below:

TABLE 1

| Layer 1 Node ID | Layer 2 Node ID | Object |
| --- | --- | --- |
| 1 | 5 | Connect |
| 23 | 23 | Link |
| 17 | 8 | Scenario |

The term "Connect" indicates that there is a connection between the nodes of two layers. However, the consumption of resources is not an issue (for example, there are essentially unlimited resources available), therefore, the connection between the nodes is unconstrained.

The term "Link" indicates that there is a connection between the nodes of two layers. In addition, resources (for example, bandwidth, wavelength) can be consumed. Therefore, the connection between the nodes is constrained.

The term "Scenario" indicates that a complex transformation is to be applied, such as "Fix", "Compute", "Select", Modify" (described above with reference to FIG. 11).

The ML link linkage module 750 stores data regarding the properties of each link. In one example, the ML link linkage module 750 may comprise a connection to a look-up table such as Table 2 below:

TABLE 2

| Layer 1 Link ID | Layer 2 Link ID | Object |
| --- | --- | --- |
| 1 | 5 | Default Mapping |
| 17 | 8, 9, 10, 24 | User Defined Mapping |

↓

TABLE 3

| Link Property | Function | Service Property |
| --- | --- | --- |
| Bandwidth (BW) | Equals | Maximum BW |
| Cost | Function | 10 × cost + 1000 |
| Delay | Constant | n/a |
| SRG | Derived | Link List |

The term "Default Mapping" indicates that the link between two layers is pre-defined. The term "User Defined Mapping" indicates that the user can define the link between the two layers.

In this embodiment, Table 2 is connected to Table 3 (as indicated by the arrow). Table 3 indicates the properties of the link ("Link Property"), the function the link ("Function") and the properties of the layer ("Service Property").

The term "Equals" indicates that the properties of the link equals the service properties of the layer. So for the first row of Table 3, the bandwidth of the link is equal to the maximum bandwidth of the layer.

The term "Function" indicates that the properties of the link are a function of service properties of the layer. So for the second row of Table 3, the cost of the link is a function of service properties of the layer, the function being set out in the final column, so the cost of the layer is 10×cost of the link+ 1000.

The term "Constant" indicates that the properties of the link are constant, they have a set value which is not a property of the service layer (thus n/a in the final column of row three). For example, the delay of the third row may be set to 10, which is constant and does not change.

The term "Derived" indicates that the properties of the links and nodes of a shared risk group (SRG) are derived using a complex function procedure.

One multi-algorithm software suite capable of performing the above mentioned process is DANI (Distributed Artificial Neural Intelligence) by Aria Networks. DANI is a self learning multi algorithm hosting platform that competes AI (Artificial Intelligence) algorithms to evolve towards an objective. The platform can operate on a single processor, multiprocessor or distributed computing environment. In addition intelligent Virtual Network Topologies (iVNT) by Aria Networks is a suite of software solutions for planning and optimisation of Next Generation Networks (NGNs) and services. A skilled person will appreciate alternatives are commercially available.

Although the apparatus 1000 is described, the processes detailed above can be performed using multiple processors. For example, a plurality of separate processors could be used evolve the multi layer network (see FIG. 12). Each processor performing computations but working from the same ML Genepool 14. This enables the computation of the "best" solutions to converge on a result set more rapidly.

The apparatus described above may be regarded as network simulation equipment implemented at least in part in software. Those skilled in the art will appreciate that the apparatus describe above may be implemented using general propose computer equipment or using bespoke equipment.

It will be appreciated by the reader that there may be many forms of multi-layer networks. Layers may be physical or logical or some combination of the two. A network may be split into multi layers by various different approaches. One possible approach is that each layer has differing constraints to other layers and therefore differentiates the layer to the others.

Although the various embodiments disclosed above refer to simulation of networks, it will be appreciated by the skilled reader that the inputs to the simulation may be data modeled, measured or otherwise captured from a network(s), layer(s) or system(s). Additionally, it will be appreciated that the path or paths generated by the simulation may be manually or automatically applied to the networks, layers or systems. For example, a path that scores the highest on a fitness function may be used to generate commands, scripts or other updates that can then be applied to routing nodes or other controllable entities or systems. In one embodiment, a simulation system may be interfaced or within a multi-layer network such that it obtains data on the network to derive the nodes and links. Once a population of paths have been evolved, one or more of the paths may be automatically applied to the network or its components. For example, the network may be a data communications network and the simulation system is used to determine best routes under certain loading or failure situations. Having identified optimal loading or failure tolerant routes, the simulation system in this embodiment would be arranged to update configuration of one or more routers in the network to take into account the optimal route or routes.

Those skilled in the art will appreciate that while the foregoing has described what is considered to be the best mode and, where appropriate, other modes of performing the invention, the invention should not be limited to the specific configurations and methods disclosed in this description of the preferred embodiment. those skilled in the art will recognise that the invention has a broad range of applications in many different types of advertising, and that the embodiments may take a wide range of modifications without departing from the inventive concept as defined in the appended claims.

The invention claimed is:

1. Network simulation system for determining routes across a multi-layer system, the network simulation system comprising:
an adaptor module configured to convert a multi-layer system into a multi-layer network of nodes and links;
a first routing engine configured to determine a plurality of populations of paths, each population of paths corresponding to a route across a layer of the multi-layer network;
a second routing engine configured to determine a plurality of multi-layer populations of paths, each multi-layer population of paths corresponding to a route across the multi-layer network and comprising populations of paths for at least two different layers of the multi-layer network selected from the plurality of populations of paths determined by the first routing engine; and
an evolving module configured to mate at least two multi-layer populations of paths from the plurality of multi-layer populations of paths to create a third multi-layer population of paths.

2. The network simulation system of claim 1, further comprising: a node linkage module configured to store node constraint data for each node of the multi-layer network.

3. The network simulation system of claim 2, wherein the node constraint data comprises data regarding properties and/or services associated with each node.

4. The network simulation system of claim 3, further comprising: a link linkage module configured to store link constraint data for each link of the multi-layer network.

5. The network simulation system of claim 4, wherein the link constraint data comprises data regarding properties and/or services associated with each link.

6. The network simulation system of claim 5, wherein the first routing engine is selected from a plurality of first routing engines based on the constraints of the layer.

7. The network simulation system of claim 6, wherein the route across a layer of the multi-layer network use properties and/or services from at least one other layer of the multi-layer network.

8. The network simulation system of claim 1, wherein the evolving module is further configured to select a first multi-layer population of paths from a plurality of multi-layer populations of paths and select a second multi-layer population of paths, different from the first multi-layer population of paths, from the plurality of multi-layer populations of paths, prior to mating the first and second multi-layer population of paths.

9. The network simulation system of claim 8, wherein the evolving module is further configured to swap at least one layer of the first multi-layer population of paths with at least one layer of the second multi-layer population of paths to create the third multi-layer population of paths.

10. The network simulation system of claim 8, wherein the evolving module is further configured to overlay the first multi-layer population of paths with the second multi-layer population of paths, to determine similarities and differences between the first and second multi-layer populations of paths, and to select at least one of the similarities and differences to create the third multi-layer population of paths.

11. The network simulation system of claim 1, wherein each node comprises a terminal point or an intersection point of the multi-layer network.

12. The network simulation system of claim 1, wherein each link comprises a connection between two or more nodes.

13. The network simulation system of claim 1, wherein the multi-layer system comprises a multi-layer system of IP routers; a multi-layer system of roads; a multi-layer telephone communication system; a multi-layer utility distribution system; a multi-layer system of blood vessels; a multi-layer system for dataflow; a multi-layer system for social interaction.

14. Network simulation system for evolving routes across a multi-layer network of nodes and links, the network simulation system comprising:
an evolving module configured to select a first multi-layer population of paths from a plurality of multi-layer populations of paths, each multi-layer population of paths corresponds to a route across the multi-layer network and comprises populations of paths for at least two different layers of the multi-layer network, and a second multi-layer population of paths from the plurality of multi-layer populations of paths, and to mate the first and second multi-layer population of paths to create a third multi-layer population of paths;
a resources module configured to assign resources to the third multi-layer population of paths; and an objective function module configured to determine at least one objective function of the third multi-layer population of paths.

15. The network simulation system of claim 14, wherein the evolving module is further configured to mutate the mated first and second multi-layer populations of paths to create the third multi-layer population of paths.

16. The network simulation system of claim 15, further comprising:
a multi-layer mutation operators module configured to store mutations to be applied to the third multi-layer population of paths.

17. The network simulation system of claim 16, wherein the evolving module is further configured to determine whether to mutate at least one population of paths of the first and second multi-layer populations of paths, and instructs a routing engine associated with the layer of the at least one population of paths to mutate the at least one population of paths in accordance with the stored mutations.

18. The network simulation system of claim 17, wherein the mutations comprise one or more of: instructing the routing engine not to perform a function on the at least one population of paths; instructing the routing engine to perform a computation on the at least one population of paths; instructing the routing engine to modify the at least one population of paths; instructing the routing engine to select a different population of paths to replace the at least one population of paths.

19. The network simulation system of claim 18, wherein modifying the at least one of the population of paths comprises modifying one or more of: topology of a layer of the at least one population of paths; properties and/or services of the nodes and/or links of a layer of the at least one population of paths; interconnections of the nodes of a layer of the at least one population of paths.

20. An article of manufacture comprising: a machine readable storage medium; and executable program instructions embodied in the machine readable storage medium that when executed by a programmable system cause the system to perform functions that determine routes across a multi-layer system, the functions comprising: converting a multi-layer system into a multi-layer network of nodes and links; determining a plurality of populations of paths, each population of paths corresponding to a route across a layer of the multi-layer network;
determining a plurality of multi-layer populations of paths, each multi-layer population of paths corresponding to a route across the multi-layer network and comprising populations of paths for at least two different layers of the multi-layer network selected from the plurality of populations of paths;
mating at least two multi-layer populations of paths from the plurality of multi-layer populations of paths to create a third multi-layer population of paths.

* * * * *